United States Patent
Pugh et al.

(10) Patent No.: US 9,481,138 B2
(45) Date of Patent: Nov. 1, 2016

(54) SEALING AND ENCAPSULATION IN ENERGIZED OPHTHALMIC DEVICES WITH ANNULAR INSERTS

(71) Applicant: Johnson & Johnson Vision Care, Inc., Jacksonville, FL (US)

(72) Inventors: Randall B. Pugh, Jacksonville, FL (US); James Daniel Riall, Saint Johns, FL (US); Adam Toner, Jacksonville, FL (US); Daniel B. Otts, Fruit Cove, FL (US); Frederick A. Flitsch, New Windsor, NY (US); Sharika Snook, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 505 days.

(21) Appl. No.: 13/837,352

(22) Filed: Mar. 15, 2013

(65) Prior Publication Data

US 2014/0264977 A1    Sep. 18, 2014

(51) Int. Cl.
*B29D 11/00* (2006.01)
*G02C 7/08* (2006.01)

(52) U.S. Cl.
CPC ... *B29D 11/00038* (2013.01); *B29D 11/00817* (2013.01); *G02C 7/083* (2013.01)

(58) Field of Classification Search
CPC .................................. B29D 11/00817
See application file for complete search history.

(56) References Cited

U.S. PATENT DOCUMENTS

| 5,238,388 A | 8/1993 | Tsai |
| 2004/0027536 A1 | 2/2004 | Blum et al. |
| 2004/0169932 A1 | 9/2004 | Esch et al. |
| 2007/0244560 A1* | 10/2007 | Ossipov ............... A61F 2/1601 623/6.14 |
| 2009/0166904 A1 | 7/2009 | Lawton et al. |
| 2010/0078837 A1 | 4/2010 | Pugh et al. |
| 2010/0078838 A1 | 4/2010 | Pugh et al. |
| 2011/0279905 A1* | 11/2011 | Pugh ...................... G02B 1/043 359/665 |
| 2012/0218508 A1 | 8/2012 | Pugh et al. |
| 2012/0236254 A1 | 9/2012 | Pugh et al. |
| 2013/0258287 A1* | 10/2013 | Pugh .................... A61B 5/1103 351/210 |
| 2014/0190004 A1* | 7/2014 | Riall et al. ........... 29/825 |
| 2014/0192313 A1* | 7/2014 | Riall et al. ............ 351/158 |
| 2014/0192314 A1* | 7/2014 | Riall et al. ............ 351/158 |
| 2014/0259657 A1* | 9/2014 | Riall et al. ........... 29/841 |
| 2014/0276481 A1* | 9/2014 | Pugh ....................... G02C 7/085 604/294 |

FOREIGN PATENT DOCUMENTS

WO    2012122411 A1    9/2012

OTHER PUBLICATIONS

Search Report issued by Singapore for corresponding Application No. 10201400433Y Page Date of Completion Oct. 28, 2014.
EP Extended Search Report for EP 14 15 9758 Date of Mailing Dec. 8, 2015; Date of Completion: Nov. 30, 2015.

* cited by examiner

*Primary Examiner* — Ryan Ochylski

(57) ABSTRACT

This invention discloses methods and apparatus for sealing and encapsulating Components on and within an annular Multi-Piece Insert. In some embodiments, an ophthalmic Lens is cast molded from a silicone hydrogel, and the Component includes a sealed and encapsulated Multi-Piece Insert portion.

24 Claims, 15 Drawing Sheets

SEALING AND ENCAPSULATION IN ENERGIZED OPHTHALMIC DEVICES WITH ANNULAR INSERTS

FIELD OF USE

This invention describes methods, apparatus, and devices related to sealing and encapsulation aspects related to ophthalmic devices and, more specifically, in some embodiments, the sealing and encapsulation aspects in the fabrication of an ophthalmic Lens with a Multi-Piece Insert within which or upon which are Components.

BACKGROUND

Traditionally, an ophthalmic device, such as a contact Lens, an intraocular Lens, or a punctal plug included a biocompatible device with a corrective, cosmetic, or therapeutic quality. A contact Lens, for example, can provide one or more of vision-correcting functionality, cosmetic enhancement, and therapeutic effects. The physical characteristics of the Lens provide each function. A design incorporating a refractive quality into a Lens can provide a vision-corrective function. A pigment incorporated into the Lens can provide a cosmetic enhancement. An active agent incorporated into a Lens can provide a therapeutic functionality. Such physical characteristics may be accomplished without the Lens entering into an Energized state.

More recently, active Components have been incorporated into a contact Lens. Some Components can include semiconductor devices. Some examples have shown semiconductor devices embedded in a contact Lens placed upon animal eyes. However, such devices lack a freestanding energizing mechanism. Although wires may extend from a Lens to a battery to power such semiconductor devices and it has been theorized that the devices may be wirelessly powered, no mechanism for such wireless power has been available.

It is desirable therefore to have additional methods and apparatus conducive to the formation of ophthalmic Lenses that are Energized to an extent suitable for providing one or more functionality into an ophthalmic Lens and controlling change in optical characteristic of an ophthalmic Lens or other biomedical device. In the process of fabricating such ophthalmic and biomedical devices, there may be numerous Components where the nature of the Components' physical and chemical isolation, or lack thereof, may be important. Novel methods, devices, and apparatus relating to the sealing and encapsulation of various Components in Energized ophthalmic and biomedical devices are therefore important.

SUMMARY

Accordingly, the present invention includes innovations relating to the sealing and encapsulation of various Components including, for example, inserts that can be Energized and incorporated into an ophthalmic device. Examples of such ophthalmic devices may include, for example, a contact Lens or a punctal plug. From a more general perspective, numerous other Energized biomedical devices may be relevant within the scope of the invention. In addition, methods and apparatus for forming an ophthalmic Lens with a sealed or encapsulated Multi-Piece Insert are presented. In some embodiments, the media in an Energized state is capable of powering a Component capable of drawing a current. Components may include, but are not limited to, a variable optic Lens element, a semiconductor device, and an active or passive electronic device. These Components may also include the ability to be activated by an external signal of various types. Some embodiments can also include a cast-molded silicone hydrogel contact Lens with a rigid or formable Energized insert contained within the ophthalmic Lens in a biocompatible fashion.

The present invention therefore includes methods for the formation of an insert by sealing at least a Front Curve Piece and a Back Curve Piece together. The method may include steps for defining electrical interconnects and attaching devices to the interconnects and/or to the curve pieces. The devices that result from the processing using these methods are also included.

In some alternative embodiments, there may be a second Back Curve Piece that is added to the previously mentioned two-piece insert. In these cases, the sealing of the various pieces may create multiple cavities. The method steps to include additional discrete pieces to inserts either in sequential processing or in parallel processing steps are consistent with the nature of the inventive art herein.

In some embodiments, inserts may contain electrical Components. Some or all of these Components may be included in the space that is internal to sealed cavities within the insert. Other embodiments may result from the placement of the electrical Components in a location that is exterior to the formed cavities. In embodiments with exterior Components, it may be useful to encapsulate the Components in their own encapsulating material.

The cavities that are formed by the various embodiments may also contain fluids of various kinds. For example, in a liquid meniscus-type embodiment, a central cavity located at least in part in an Optical Zone of an ophthalmic insert may contain liquids related to the formation of Lenses. In some embodiments, the liquid may be placed within the region that defines the cavity before or during the sealing process that defines the cavity. In other cases, the liquid may be added after the formation of a sealed cavity, for example, by injection of filling needles through one or more regions in either a Back Curve Piece or Front Curve Piece followed by the subsequent sealing of the resulting penetration in the Back Curve Piece or Front Curve Piece.

The methods of forming seals and the resulting sealing devices are important aspects of various embodiments. In some embodiments, the seals may include preformed materials that are formed into shapes consistent with the subsequent formation of sealed regions. In other embodiments, seals may be formed in place by the application of sealing agents upon a surface of one or both of the Back Curve Piece and Front Curve Pieces. In some of these embodiments, the applied sealing agent may be allowed to cure before the assembly of multiple pieces; in other cases, the uncured sealing material will be further processed to assemble multiple pieces.

In embodiments with either pre-cured sealing materials or uncured sealing materials, the two pieces that are sealed with these materials to each other may be held in place or pressed together to form the seal. In some embodiments, the surfaces that are pressed together to form a physical contact for the seal may be subsequently held in place by the placement of an adhesive material spanning the two pieces, which, after curing, permanently affixes the two surfaces in place and maintains the sealing aspect of the seal material between the two pieces.

In some alternative embodiments, the surfaces that are pressed together may activate a self-sealing mechanism. The self-sealing mechanism may lock or self-lock the two or more pieces together and maintain pressure on the sealing material, which in turn maintains the physical contact to form the seal integrity. Other mechanisms may include additional features in the sealing region such as, for example, grooves for the placement of sealing material and knife-edges in the surface topography to better enhance the performance of the sealing region.

The features that are attached upon either or both of the Front Curve Piece and Back Curve Piece may also have embodiments relating to their sealing or encapsulating. The conductive traces, energization elements, and/or the electronic Components may have sealing or encapsulating material deposited in such a manner to span the entire trace, energization element, or Component, therefore allowing for contact between the encapsulating and sealing material on either end and either or both of the Front Curve Piece or Back Curve Piece material.

The resulting Multi-Piece Insert devices may be further processed to form ophthalmic devices and novel methods relating to the methods of these ophthalmic device formation. In some embodiments, an insert may be placed within a first Mold part where a small amount of Lens body forming material may be found. In other embodiments, this Lens-Forming Mixture may include, for example, hydrogel-forming materials. Additional Lens-Forming Mixture may be added before, during, or after a second Mold part is moved into proximity to the first Mold part. The movement of the second Mold part in proximity to the first Mold part may form a cavity in which the insert and Lens-Forming Mixture may be molded into a composite Lens with high quality optical surfaces. The insert that is embedded in this resulting ophthalmic device may have encapsulated Components and/or Components that reside in sealed regions. Additionally, the molded Lens-Forming Mixture, which in some embodiments may surround the insert, may be considered an insert-encapsulating layer. The Components within or upon the insert may include electronic traces, energization devices, electronic devices including, for example, integrated circuits, and active optic elements including, for example, liquid meniscus Lenses.

DETAILED DESCRIPTION OF THE INVENTION

Figure 1:
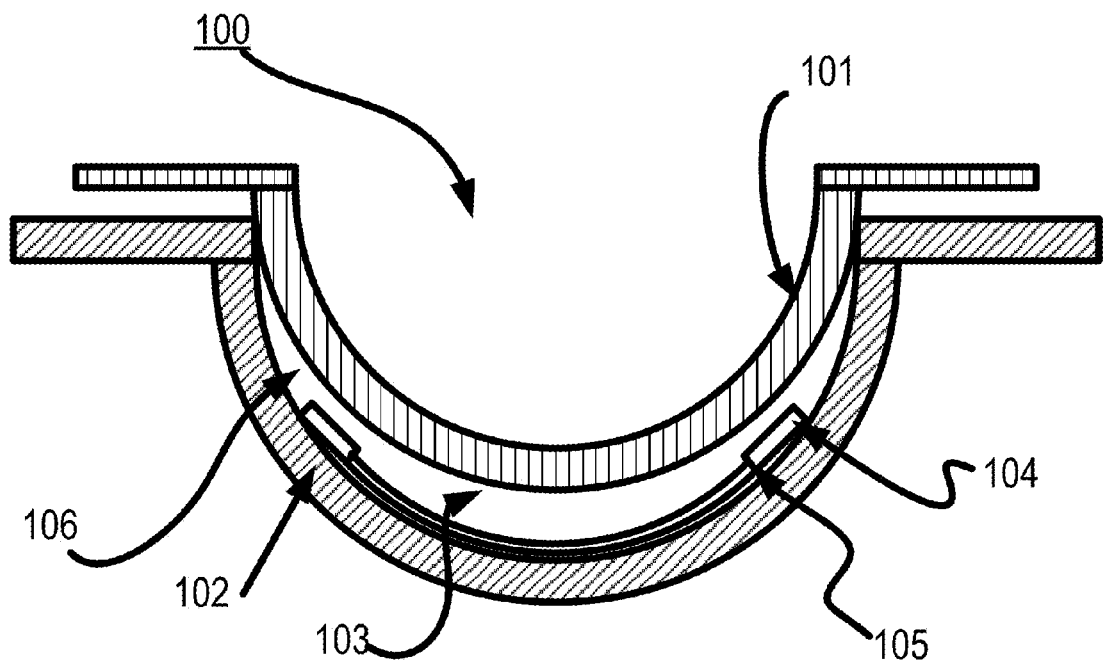
FIG. 1 illustrates exemplary Mold assembly apparatus components that may be useful in implementing some embodiments of the present invention.

The present invention includes methods and apparatus for manufacturing an ophthalmic Lens with a Multi-Piece Insert where portions of the insert and Components comprising the insert may include aspects of sealing and encapsulation. In addition, the present invention includes an ophthalmic Lens with a Multi-Piece Insert incorporated into the ophthalmic Lens including the aspects of sealing and encapsulation.

According to the present invention, an Energized Lens is formed with an embedded insert and an Energy Source, such as an electrochemical cell or battery as the storage means for the Energy. In some embodiments, the materials comprising the Energy Source are encapsulated and isolated from an environment into which an ophthalmic Lens is placed.

In some embodiments, a Multi-Piece Insert also includes a pattern of circuitry, Components, and Energy Sources. Various embodiments may include the Multi-Piece Insert locating the pattern of circuitry, Components, and Energy Sources around a periphery of an Optical Zone through which a wearer of a Lens would see. Other embodiments may include a pattern of circuitry, Components, and Energy Sources that are small enough to not adversely affect the sight of a contact Lens wearer, and therefore the Multi-Piece Insert can locate them within, or exterior to, an Optical Zone.

In general, according to some embodiments of the present invention, a Multi-Piece Insert is integrated into an ophthalmic Lens via automation that places an Energy Source in a desired location relative to a Mold part used to fashion the Lens. The embodiments that place the various Components into the ophthalmic Lens may employ one or more steps where Components are sealed and adhered into place or where Components are encapsulated.

In some embodiments, an Energy Source is placed in electrical communication with a Component that can be activated on command and draws electrical current from the Energy Source included within the ophthalmic Lens. A Component may include, but is not limited to, a semiconductor device, an active or passive electrical device, or an electrically activated machine, including, for example, microelectromechanical systems (MEMS), nanoelectromechanical systems (NEMS), or micromachines. Subsequent to placing the Energy Source and Component, the Mold part can shape and polymerize a Reactive Mixture to form the ophthalmic Lens.

In the following sections, detailed descriptions of embodiments of the invention will be given. The description of both preferred and alternative embodiments are exemplary embodiments only, and it is understood that to those skilled in the art that variations, modifications, and alterations may be apparent. It is therefore to be understood that said exemplary embodiments do not limit the scope of the underlying invention.

GLOSSARY

In this description and claims directed to the presented invention, various terms may be used for which the following definitions will apply:

Back Curve Piece: as used herein refers to a solid element of a Multi-Piece Insert that, when assembled into the said insert, will occupy a location on the side of the Lens that is on the back. In an ophthalmic device, said piece would be located on the side of the insert that would be closer to the wearer's eye surface. In some embodiments, the Back Curve Piece may contain and include a region in the center of an ophthalmic device through which light may proceed into the wearer's eye. This region may be called an Optical Zone. In other embodiments, the piece may take an annular shape where it does not contain or include some or all of the regions in an Optical Zone. In some embodiments of an ophthalmic insert, there may be multiple Back Curve Pieces, and one of them may include the Optical Zone, while others may be annular or portions of an annulus.

Component: as used herein refers to a device capable of drawing electrical current from an Energy Source to perform one or more of a change of logical state or physical state.

Encapsulate: as used herein refers to creating a barrier to separate an entity, such as, for example, a Multi-piece Insert, from an environment adjacent to the entity.

Energized: as used herein refers to the state of being able to supply electrical current to or to have electrical Energy stored within.

Energy: as used herein refers to the capacity of a physical system to do work. Many uses within this invention may relate to the said capacity being able to perform electrical actions in doing work.

Energy Source: as used herein refers to a device capable of supplying Energy or placing a biomedical device in an Energized state.

Energy Harvesters: as used herein refers to device capable of extracting Energy from the environment and convert it to electrical Energy.

Front Curve Piece: as used herein refers to a solid element of a Multi-Piece Insert that, when assembled into the said insert, will occupy a location on the side of the Lens that is on the front. In an ophthalmic device, said piece would be located on the side of the insert that would be further from the wearer's eye surface. In some embodiments, the piece may contain and include a region in the center of an ophthalmic device through which light may proceed into the wearer's eye. This region may be called an Optical Zone. In other embodiments, the piece may take an annular shape where it does not contain or include some or all of the regions in an Optical Zone. In some embodiments of an ophthalmic insert, there may be multiple Front Curve Pieces, and one of them may include the Optical Zone, while others may be annular or portions of an annulus.

Lens: as used herein refers to any ophthalmic device that resides in or on the eye. These devices can provide optical correction or may be cosmetic. For example, the term Lens can refer to a contact Lens, intraocular Lens, overlay Lens, ocular insert, optical insert, or other similar device through which vision is corrected or modified, or through which eye physiology is cosmetically enhanced (changing appearance of iris color) without impeding vision. In some embodiments, the preferred Lenses of the invention are soft contact Lenses and made from silicone elastomers or hydrogels.

Lens-Forming Mixture or Reactive Mixture or Reactive Monomer Mixture (RMM): as used herein refers to a monomer or prepolymer material that can be cured and crosslinked or crosslinked to form an ophthalmic Lens. Various embodiments can include Lens-Forming Mixtures with one or more additives such as, for example, UV blockers, tints, photoinitiators or catalysts, and other additives useful in ophthalmic Lenses such as contact or intraocular Lenses.

Lens-Forming Surface: as used herein refers to a surface that is used to mold a Lens. In some embodiments, any such surface can have an optical quality surface finish, which indicates that it is sufficiently smooth and formed so that a Lens surface fashioned by the polymerization of a Lens forming material in contact with the molding surface is optically acceptable. Further, in some embodiments, the Lens-Forming Surface can have a geometry that is necessary to impart to the Lens surface the desired optical characteristics, including without limitation, spherical, aspherical and cylinder power, wave front aberration correction, corneal topography correction, or combinations thereof.

Lithium Ion Cell: as used herein refers to an electrochemical cell where lithium ions move through the cell to generate electrical Energy. This electrochemical cell, typically called a battery, may be Reenergized or recharged in its typical forms.

Multi-Piece Insert: as used herein refers to a formable or rigid substrate capable of supporting an Energy Source within an ophthalmic Lens. In some embodiments, the Multi-Piece Insert also supports one or more Components.

Mold: as used herein refers to a rigid or semi-rigid object that may be used to form Lenses from uncured formulations. Some preferred Molds include two Mold parts forming a front curve Mold part and a back curve Mold part.

Optical Zone: as used herein refers to an area of an ophthalmic Lens through which a wearer of the ophthalmic Lens sees.

Power: as used herein refers to work done or energy transferred per unit of time.

Rechargeable or Reenergizable: as used herein refers to a capability of being restored to a state with higher capacity to do work. Many uses within this invention may relate to the capability of being restored to a state with the ability to flow electrical current at a certain rate for a certain, reestablished time period.

Recharge or Reenergize: as used herein refers to an act of restoring to a state with higher capacity to do work. Many uses within this invention may relate to restoring a device to a state with the capability to flow electrical current at a certain rate for a certain, reestablished time period.

Released from a Mold: as used herein refers to an act where a Lens is either completely separated from the Mold or is only loosely attached so that it can be removed with mild agitation or pushed off with a swab.

Stacked Integrated Component Devices (SIC-Devices): as used herein refers to the product of packaging technologies that can assemble thin layers of substrates, which may contain electrical and electromechanical devices, into operative integrated devices by means of stacking at least a portion of each layer upon each other. The layers may comprise Component devices of various types, materials, shapes, and sizes. Furthermore, the layers may be made of various device-production technologies to fit and assume various contours.

Ophthalmic Lenses

Proceeding to FIG. 1, an apparatus 100 to form ophthalmic devices containing sealed and encapsulated inserts is depicted. The apparatus includes an exemplary front curve Mold 102 and a matching back curve Mold 101. An insert 104 and a body 103 of the ophthalmic device may be located inside the front curve Mold 102 and the back curve Mold 101. In some embodiments, the material of the body 103 may be a hydrogel material, and the insert 104 may be surrounded on all surfaces by this material.

The insert 104 may be one of many different types of inserts. In FIG. 1, there may be at least one sealed surface 105 in the insert 104. Other embodiments may include different types of seals and encapsulations, some of which are discussed in later sections. The use of the apparatus 100 may create a novel ophthalmic device comprised of a combination of Components with numerous sealed regions.

Figure 2:
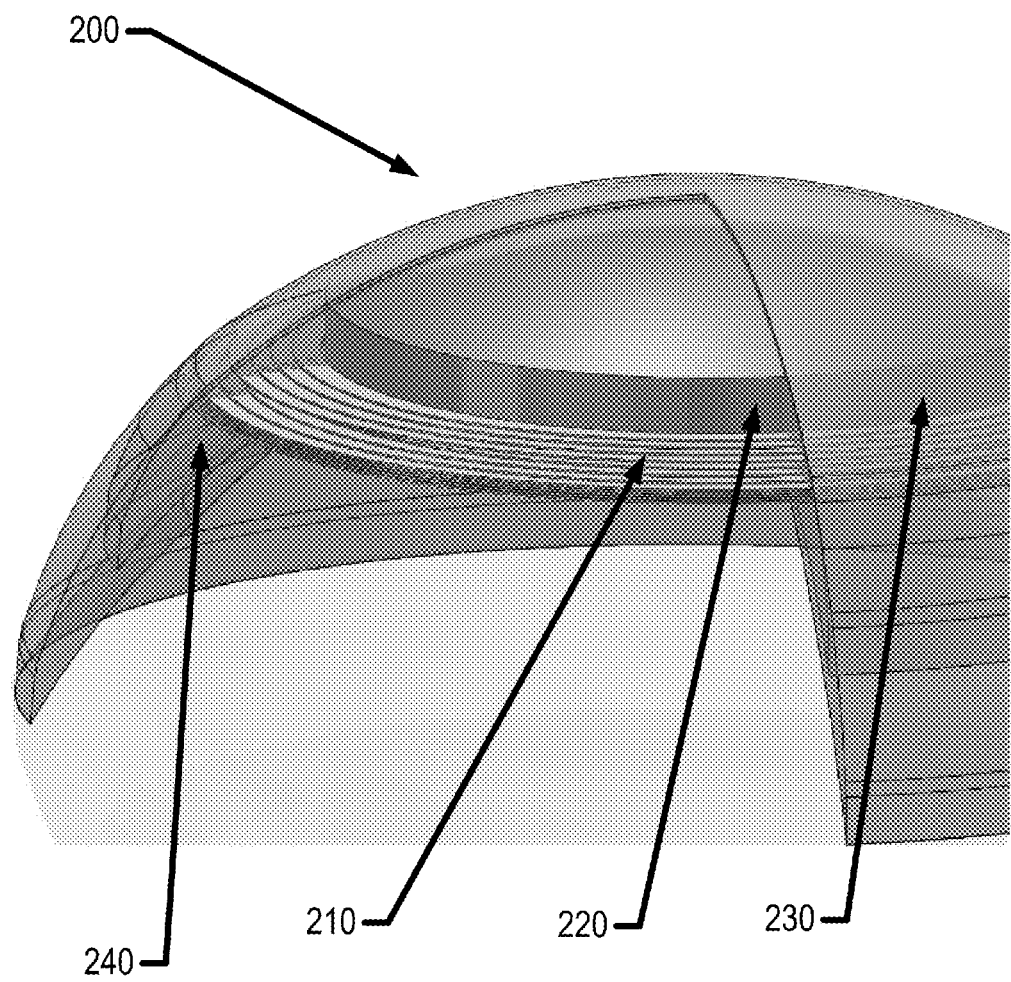
FIG. 2 illustrates an exemplary Energized ophthalmic Lens with a Multi-Piece Insert embodiment.

Proceeding to FIG. 2, an exemplary embodiment 200 of said novel ophthalmic device is depicted in cross section. An ophthalmic device shell 230 may surround the embodiment 200. The shell 230 may be formed by the Mold embodiment 100 depicted in FIG. 1 and may be comprised of numerous materials, including, for example, hydrogel compounds.

This embodiment 200 may also include an insert 240. In some embodiments, the insert 240 may be comprised of multiple pieces, and it may utilize seals of various kinds to assemble the insert 240.

This embodiment 200 may include a Component device layer 210 that may include, for example, activation elements, processing elements, energization elements, and sensing elements. Numerous encapsulation schemes may be relevant to the inclusion of a Component device layer 210. In some embodiments, the layers 210 may be adhered to other Components, such as, for example, an active optical device 220, before the resulting insert is then fixed into an ophthalmic device as depicted in FIG. 1. The active optical device 220 may be a liquid meniscus-type Lens filled with two different immiscible fluids and then sealed.

Seals and Encapsulating Features—Glue Groove

Figure 3:
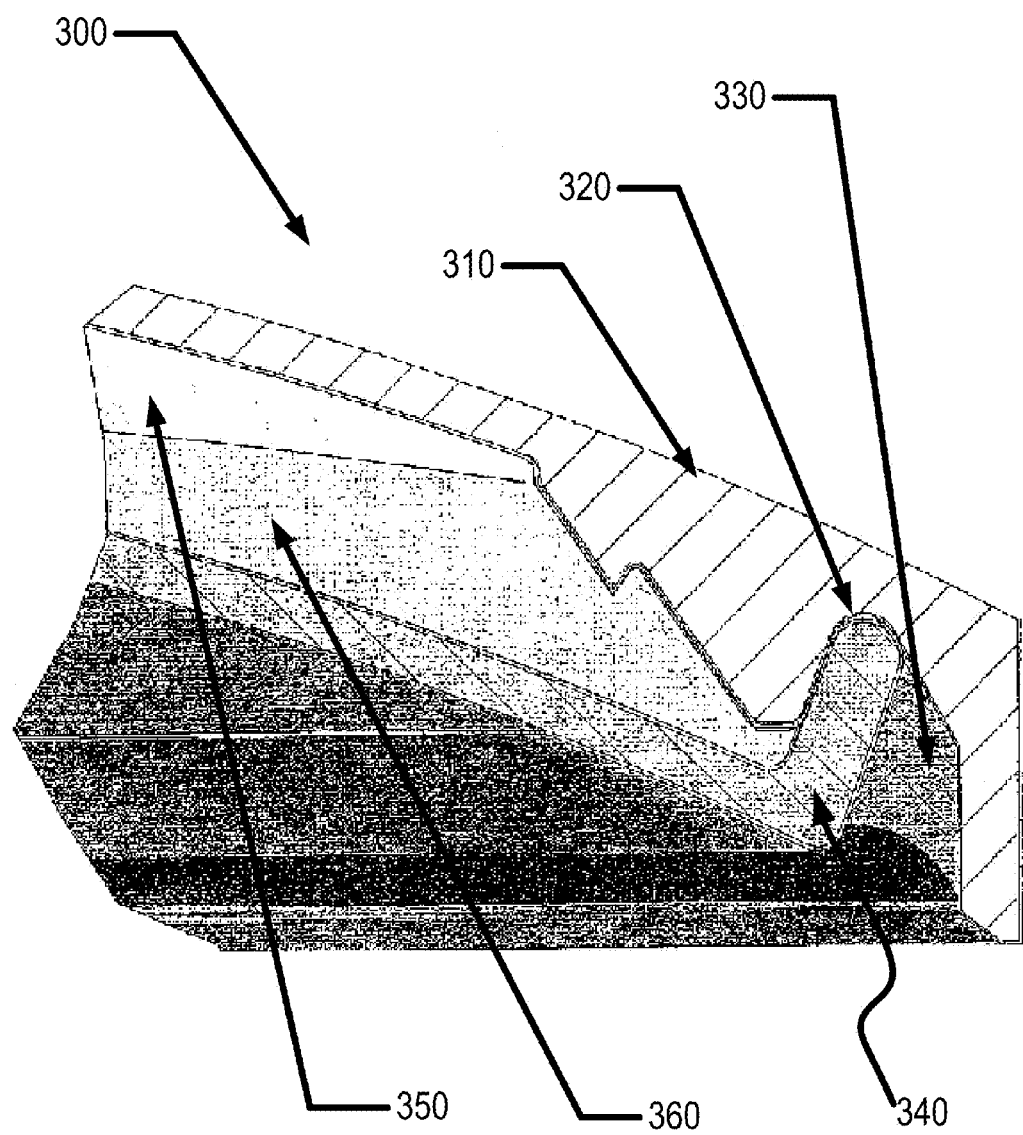
FIG. 3 illustrates a cross-sectional representation of an exemplary sealing embodiment for a Multi-Piece Insert.

Proceeding to FIG. 3, a magnified cross section of the edge 300 of an exemplary optical device 220 is shown. For example, the aqueous phase 360 and the nonaqueous phase 350 may represent the two immiscible fluids in a meniscus-type Lens. The front surface 310 of the active device may be a molded separate piece onto which various electrode metal layers may have been deposited. The molded front piece 310 may have a glue groove, recess, or slot 320, which will then intersect with the molded, but separate, back piece 340. This glue groove 320 may serve as a receptacle for an adhesive, sealant, or glue, as examples. After the Front Curve Piece 310 and the Back Curve Piece 340 are brought into proximity to each other, either before or after the fluids 350 and 360 fill a cavity formed by the two pieces 310 and 340, the Back Curve Piece 340 may be advanced to firmly register into the glue groove 320. Thereafter, an adhesive 330 may be deposited into the remaining space of the glue groove 320 to create a sealed region 330. In some embodiments, this glue groove 320 may be located around the entire periphery of the Lens device itself.

Numerous methods may effectively apply adhesives into the glue groove 320. Some embodiments may include application by spray nozzles, as with, for example, printing equipment, or other embodiments may deposit into the glue groove 320 preformed adhesives, which are then either caused to flow and bond by heat light, pressure, or other standard means of forming seals and bonds. Many types of adhesives may form the sealed region 330. Table 1 lists some examples of the types of materials that may be utilized for this sealing application and possible respective embodiments. Table 1 also describes some representative characteristics of some materials in each of the categories. One ordinarily skilled in the art will recognize that materials other than those discussed may also be included within the scope of the claims.

TABLE 1

Partial Listing of exemplary sealing materials, encapsulating materials and coating materials

| Material | Exemplary aspects of utility |
| --- | --- |
| Epoxy Systems | One Component - high temp cure, excellent adhesive, biocompatible |
| | Two Component - fast cure at ambient, biocompatibility, gap filling |
| Silicone Systems | One Component - resistance to humidity, high flexibility, Insulation, Optical Clarity |
| | Two Component - Strength, Superior Flexibility, biocompatibility |
| UV Curable Systems | Fast Cure, grades with Flexibility, vapor free |
| LED Curable Systems | One Component, Low Temperature applications |
| Polyurethanes | Optical Clarity, Insulation, Flexibility |
| Polysulfides | Underwater cure, high Strength, high chem resistance |
| Cyanoacrylates | Biocompatibility, single compound, no outgassing |
| Elastomeric Systems | Excellent water resistance, Insulation, single compound |
| Film Adhesives | Preform-ability, excellent insulation characteristics |
| Hot Melt Systems | Food Contact Grades |
| Latex Systems | Pressure Sensitive Applications, Food Contact Grades |
| Polyimides | Photosensitive, Preform-ability, Flexibility |
| Parylenes (Vapor Phase Film Dep) | Surface Treatment, Insulation, Conformal Application |

Figure 4A:
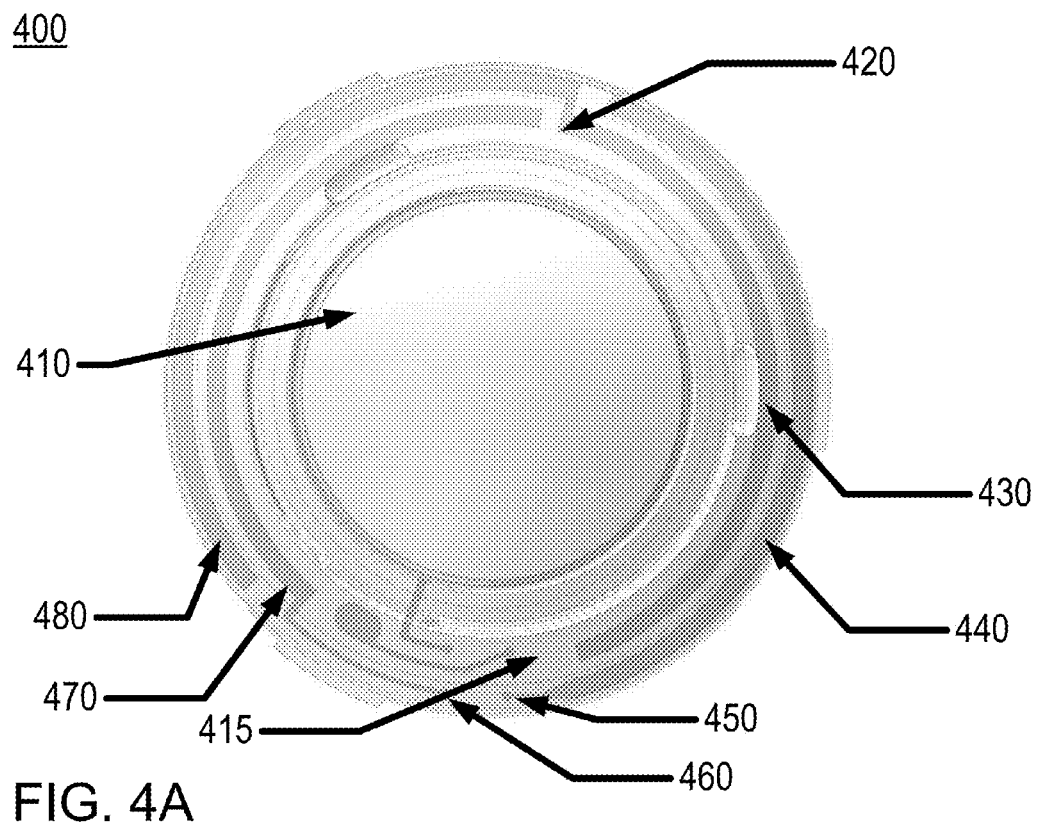
FIG. 4A illustrates a top down representation of an exemplary two-piece insert embodiment of a Multi-Piece Insert.
Figure 4B:
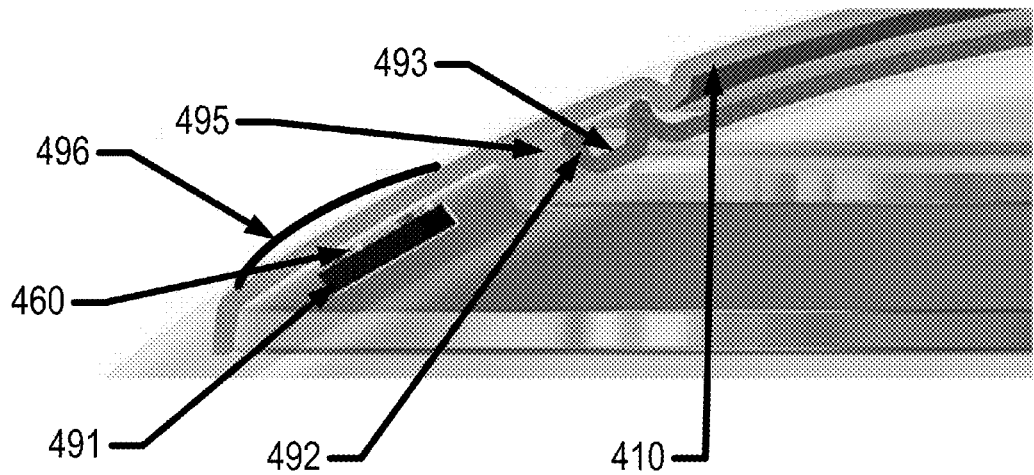
FIG. 4B illustrates a cross-sectional representation of an exemplary two-piece insert embodiment of a Multi-Piece Insert.

FIGS. 4A and 4B illustrate a different embodiment 400 with a glue groove 495. This embodiment may be comprised of a two-piece assembly with a Front Curve Piece 410 and Back Curve Piece 492 with a cavity between the two pieces 410 and 492 used to house an active optical device, such as, for example, a meniscus-type Lens. The Front Curve Piece 410 may be molded or formed to be larger than the size of the active optical element wherein the extra dimension creates a support area 415, which provides a mounting surface for Components, interconnects, and eventually numerous types of sealing aspects. FIG. 4A illustrates an enlarged Front Curve Piece 410 from top down.

Various electrical interconnects and interconnect features 430 and 440 may be located on this enlarged Front Curve Piece 410. In some embodiments, these interconnect features 430 and 440 may connect to energization elements, such as, for example, batteries. In other embodiments, the energization elements may be deposited or attached upon the electrical interconnects along the interconnect lines 430, 440, 470 and 480. In some specific embodiments, a first interconnect may be attached to a second interconnect 480 via a crossover 420. Connection points 450 and 460 may be used to interconnect the energization elements to other elements.

Elements may be formed from materials that may or may not be stable in the environments that ophthalmic devices occupy, including, for example, the tear fluid on an ocular surface that contacts the element. The use may include forming encapsulation layers from coatings, including, for example, a parylene family including, but not limited to, the parylene C, N, and D family elements. In some embodiments, the encapsulation coating may occur before or after application of other adhesive or sealant layers.

FIG. 4B represents a direction of cross section to form the lower cross section image in the figure. As mentioned above, some embodiments include interconnect features, such as, for example, a connection point, where Components 491 are attached. An exemplary Component 491 may include, for example, an integrated circuit attached to the connection point 460 by conductive epoxy as an example of a conductive material. In some embodiments, the attached Components 491 may typically be adhered to a support area 415 of the Front Curve Piece 410 via the under-filling of adhesive underneath, or in between, the Component body and the attaching surface. Coatings or adhesives may also subsequently be applied to the integrated circuit or other Component 491 to encapsulate it and connect it to the Front Curve Piece 410. As shown in the cross section image, there may be a back curve feature 493. The nature of the seal designs that derive from an embodiment 490 with this back curve feature 493 will be discussed in the following sections in some detail.

In another aspect, in some embodiments, a colorant layer 496 may be included along a periphery region to modify the visualize appearance of the lens. The colorant layer may be added for example, via a pad printing or ink jet type process.

Figure 5:
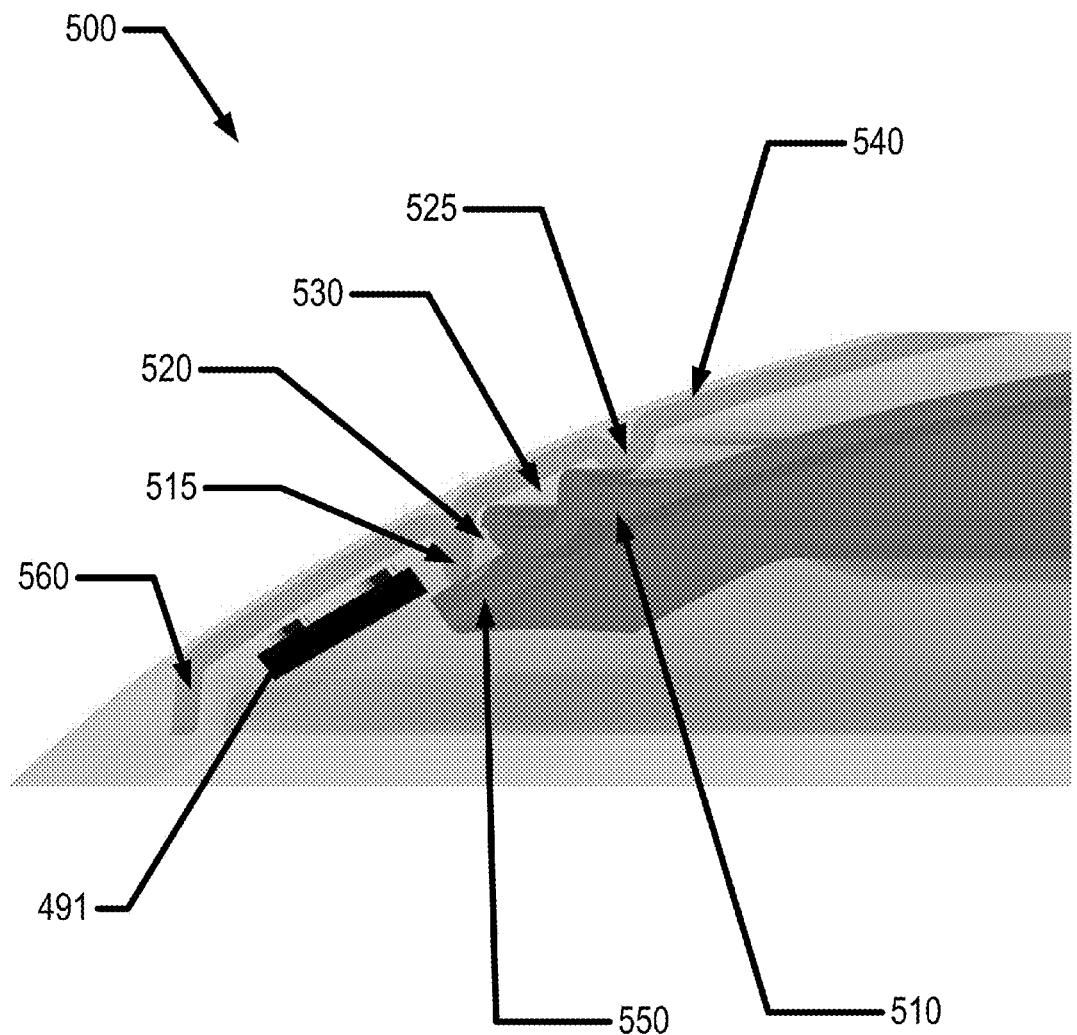
FIG. 5 illustrates an alternative embodiment of the Multi-Piece Insert sealing region of the exemplary device in FIG. 4B.

Proceeding to FIG. 5, this embodiment 500 includes exemplary sealing features of the two-piece insert embodiments in FIGS. 4A and 4B. A Front Curve Piece 540 of a Multi-Piece Insert, in some embodiments, as in the one shown, may contain a molded or formed feature 525 that may serve the dual purpose of defining one side of a glue seal region 520 and providing a surface upon which electrodes may be deposited for various purposes. In some embodiments, like that shown, the Front Curve Piece 540 may include a protrusion 515 to serve as an opposite side of a glue seal region 520. The Back Curve Piece 510 of the Multi-Piece Insert may have a molded feature that forms the mating surface for the glue seal region 515. In this embodiment, the Back Curve Piece 510 has a two-feature mating surface, which then defines an interior cavity region 530 and an exterior region 520 of the resulting glue seal.

In some embodiments, the glue seal regions 525 and 515 may be filled with an adhesive before the Back Curve Piece 510 is located into place, causing the adhesive to flow around the two sealing regions 520 and 530. Alternatively, the glue seal region 530 may be filled before the Back Curve Piece 510 is moved into place against the Front Curve Piece 540, allowing the adhesive to flow around the cavity forming both a seal and a bond. In some embodiments, the glue seal region 520 may be filled with an adhesive in a separate step that may include the same or different material from the first cavity-filling step. The various materials of Table 1 may be used in said embodiments 500. This includes, but is not limited to, the use of adhesives to function under aqueous conditions or the use of relatively solid preformed sealants to fill the glue seal region 530.

In other embodiments, the sealing system 515, 520, 530, 525, 510 may be located closer to the outer edge 560 of the Front Curve Piece 540. The minimum distance between the glue seal region 515 and the outer edge 560 still allows for the housing and support of a Component 491, such as, for example, integrated circuitry.

Other alternative embodiments may include a flap, extension, or appendage 550 that extends the Back Curve Piece 510 to as far as the outer edge 560 of the Front Curve Piece 540. This appendage 550 may serve a dual purpose of strengthening the glue seal region 520 and further protecting the Component 491.

Figure 6:
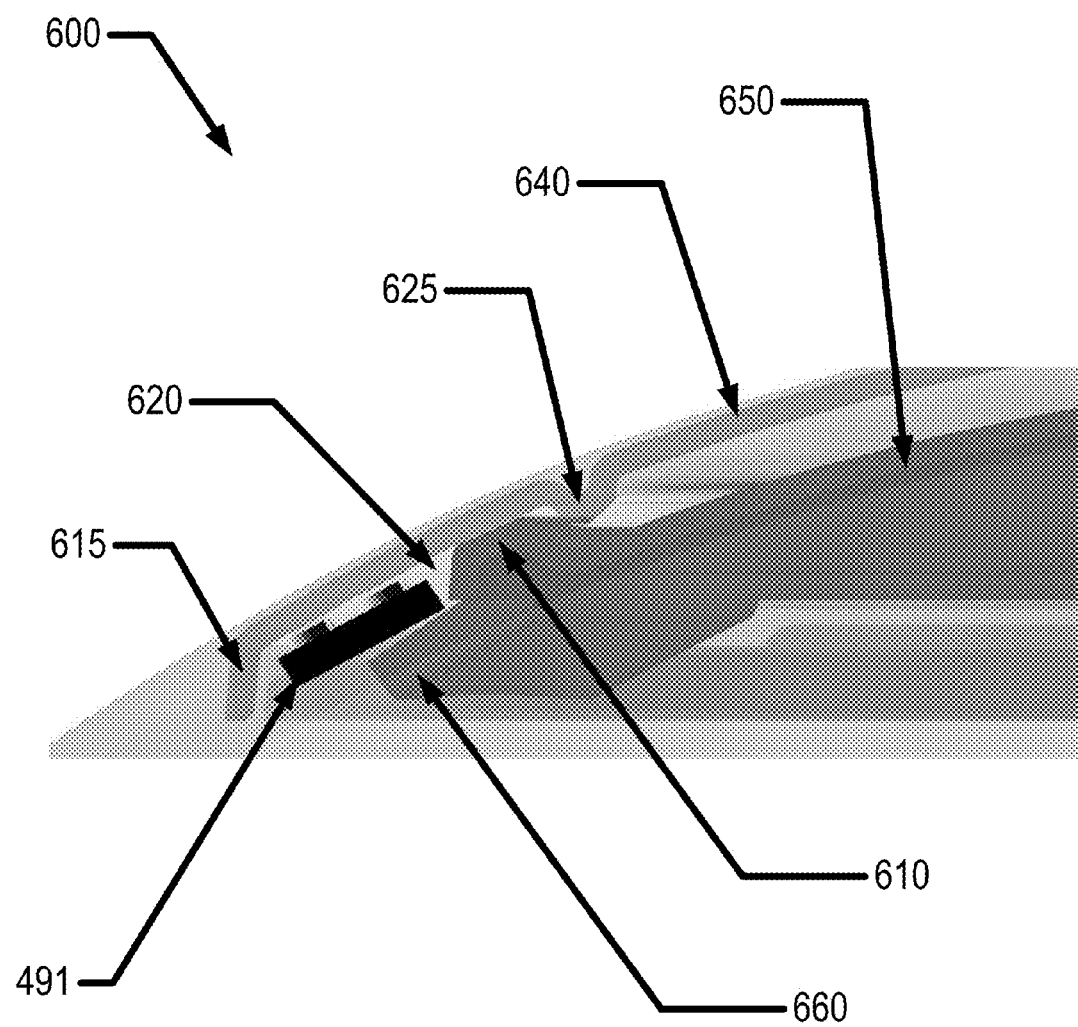
FIG. 6 illustrates an alternative embodiment of the Multi-Piece Insert sealing region of the exemplary device in FIG. 4B.

In FIG. 6, another exemplary embodiment 600 includes a Front Curve Piece 640 of a Multi-Piece Insert and a Back Curve Piece 650. In this embodiment, the glue seal region may span the interior cavity 620 between the Back Curve Piece 650 and the Front Curve Piece 640 from a formed feature 625 to the outer edge 615 and may be modified to include the Component 491, such as, for example, interconnection and integrated circuitry. The formed feature 625 may have a dual purpose of defining a glue seal region 620 from 625 to 615 and providing mounting surface for formed electrodes.

In another alternative embodiment, the design of the Back Curve Piece 650 feature 610 that resides in the glue seal region 620 from 625 to 615 may be a single feature 610. In this exemplary embodiment, the interior cavity 620 is formed by a flap feature 660 and a sealing feature 610 into the glue seal region 620 from 625 to 615. The materials of Table 1 provide examples of the materials that may be effective in sealing and encapsulation of the insert device. From a general perspective, it may be obvious to one skilled in the art that numerous embodiments of the glue seal regions and the Front Curve Piece and Back Curve Piece features may be practical, and such devices are well within the scope of the claims.

Seals and Encapsulating Features—Compression Seal

Figure 7:
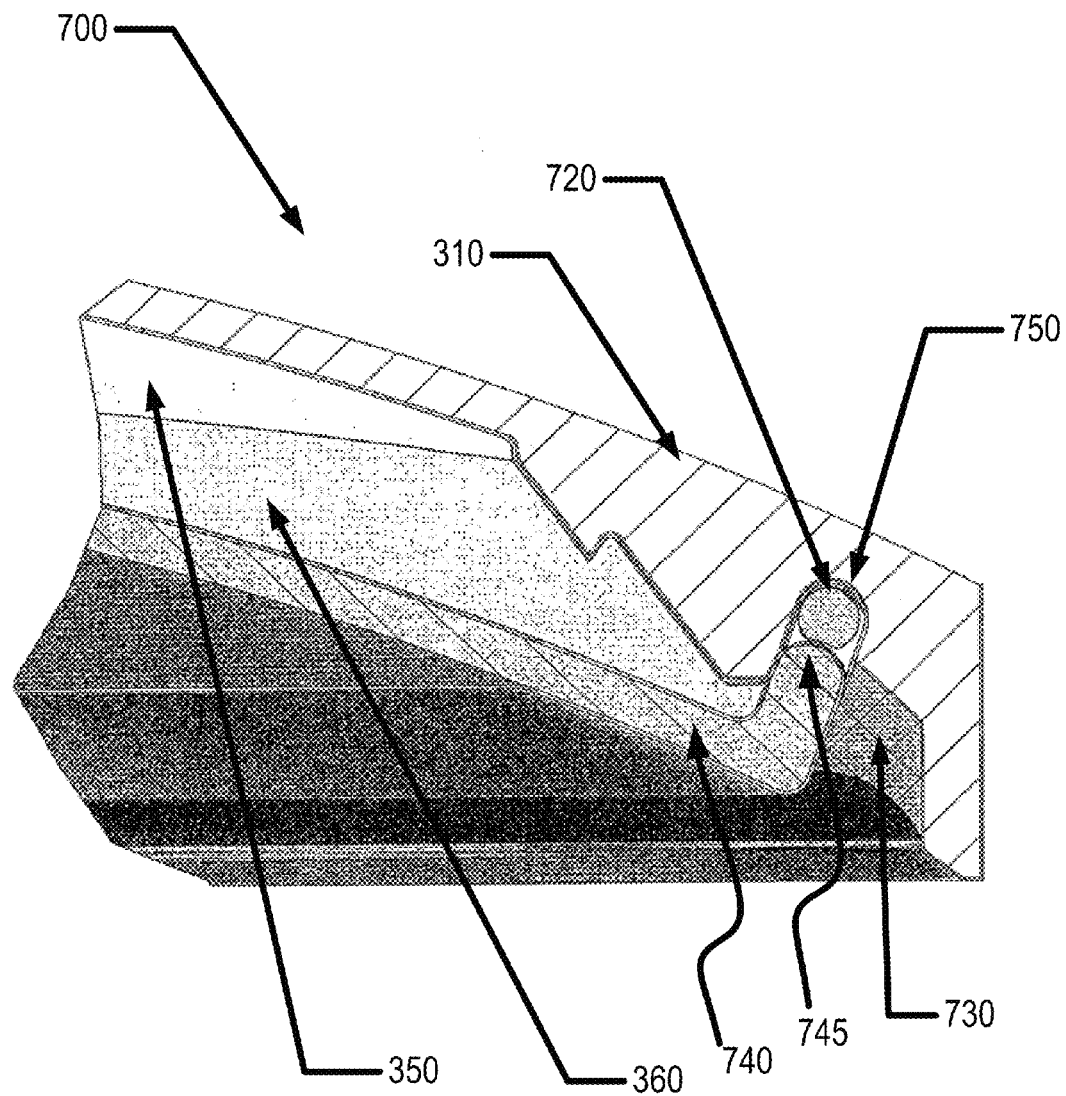
FIG. 7 illustrates an alternative embodiment of the sealing region in the exemplary device in FIG. 3.

FIG. 7 illustrates an alternate embodiment that includes a different type of seal system 745 and 720 that may seal a Multi-Piece Insert device 700. In some embodiments, the nature of at least one of the seals may involve a compression seal between two surfaces. This embodiment 700 includes an exemplary Back Curve Piece 740 with a surface 745 that compresses another sealing feature 720, which may be formed as a deposited seal from various adhesive materials, including, for example, the materials listed in Table 1.

In a specific embodiment, the sealing feature 720 may be an elastomeric o-ring that is placed into a groove 750 in the Front Curve Piece 310, which creates a compressed location for the sealing features 720 and 745. When pressure is applied to the Front Curve Piece 310 and the Back Curve Piece 740, a compression seal may form between a sealing feature 745 on the Back Curve Piece 740 and the sealing feature 720 in the groove 750. In some embodiments, an adhesive may be placed into the rest of the sealing groove 730 to lock the Front Curve Piece 310 and the Back Curve Piece 740 into the groove 750. In this embodiment, a compression-type seal in an ophthalmic device contains a fluid-based liquid meniscus embodiment; in other embodiments, this type of seal may be used for sealing needs in the ophthalmic Lens environment, such as, for example, the sealing system demonstrated in FIG. 6.

Seals and Encapsulating Features—Knife-Edge Seal

Figure 8:
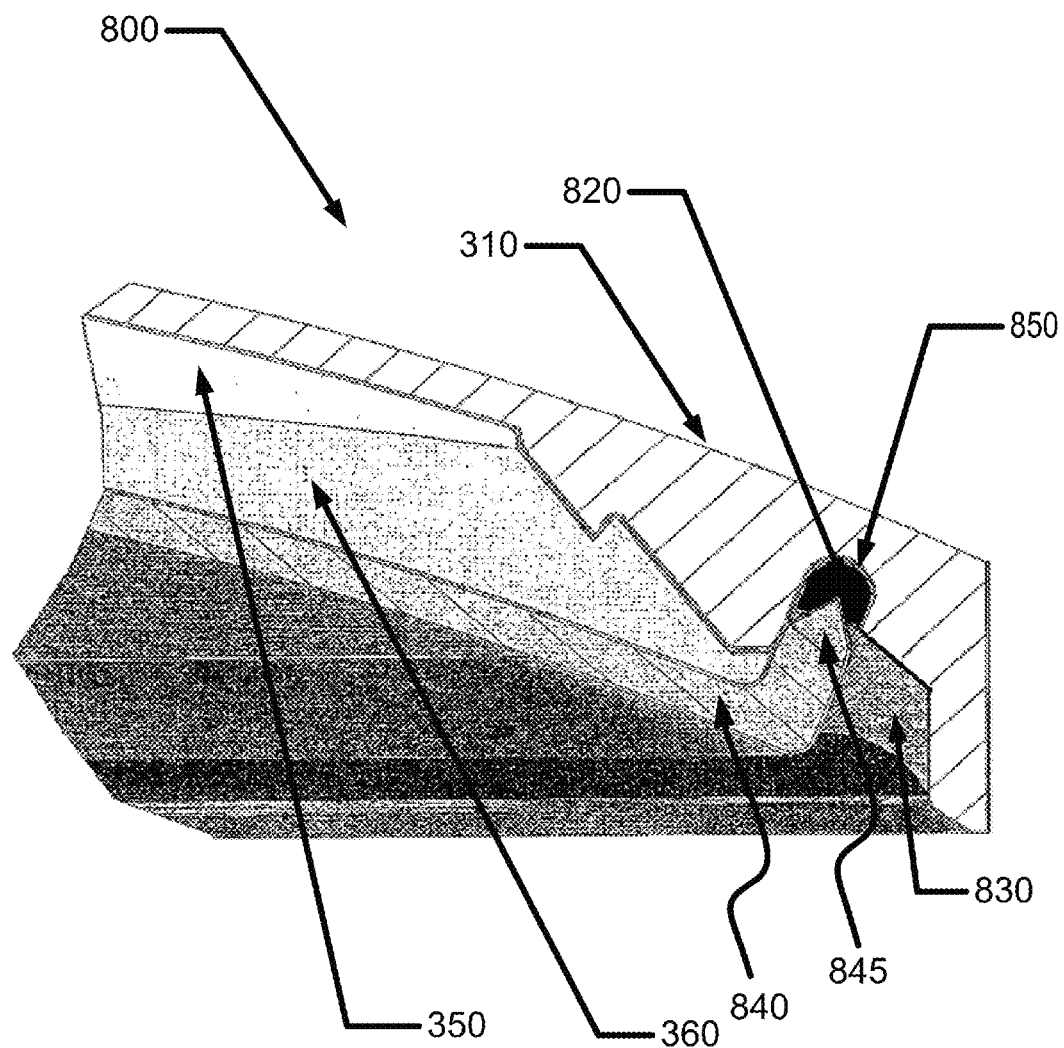
FIG. 8 illustrates an alternative embodiment of the sealing region in the exemplary device in FIG. 3.

FIG. 8 includes an alternative embodiment of a seal that may be formed to seal a Multi-Piece Insert device 800. In said embodiments, the nature of at least one of the seals may involve a knife-edge seal 845 between a Back Curve Piece 840 and a Front Curve Piece 310. An exemplary Back Curve Piece 840 may have a sharpened surface 845 that can lock into another sealing feature 820. In some embodiment, the sealing feature 820 may be formed as a deposited seal using, for example, the adhesive materials in Table 1. Other embodiments may include an o-ring type preformed feature 820 that may be placed into a groove 850 wherein the knife-edge feature 845 may be compressed into the sealing feature 820. Alternatively, an uncured or cured adhesive material may be applied to the groove 850 to create a sealing feature 820 into which the knife-edge feature 845 may be forced. In embodiments where the sealing feature 820 is uncured adhesive, the Front Curve Piece 310 and the Back Curve Piece 840 may be sealed and adhesively affixed by the surface formed by the knife-edge surface 845 into the sealing feature 820.

In other embodiments, regardless of the nature of the seal formed with the sealing feature 820, a subsequent exemplary step may include placing an adhesive into the rest of the sealing groove 830 to lock the Front Curve Piece 310 and the Back Curve Piece 840 into place. In this specific embodiment, the knife-edge sealing system 845, 820, and 850 in the ophthalmic device 800 is based on a fluid-based liquid meniscus embodiment. This type of sealing system 845, 820, and 850 could also be effective in other types of sealing need in the ophthalmic Lens environment, such as, for example, the sealing of the type demonstrated in FIG. 6.

Figure 9:
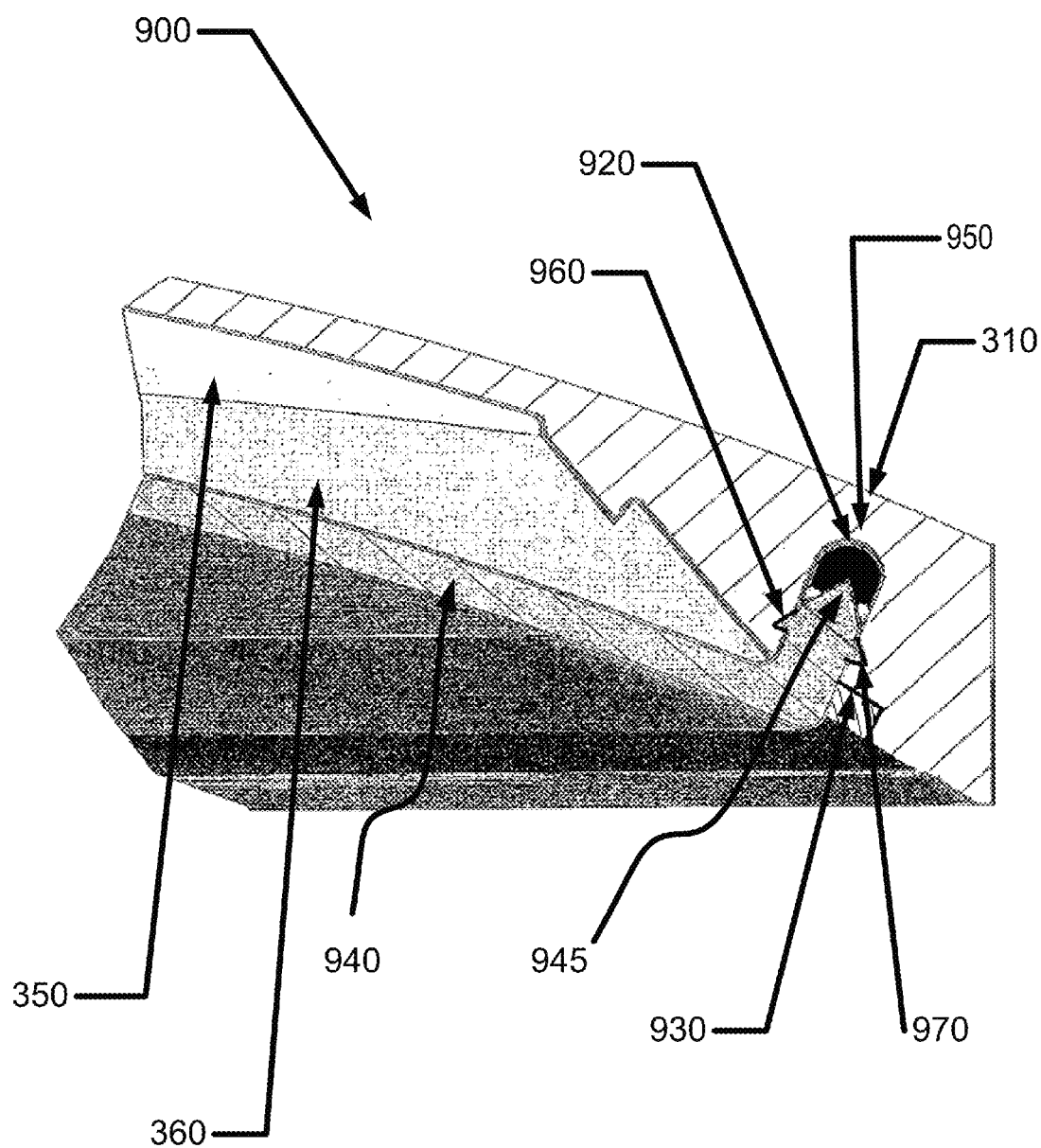
FIG. 9 illustrates an alternative embodiment of the sealing region in the exemplary device in FIG. 3.

FIG. 9 illustrates an alternative embodiment of a knife-edge type seal in an ophthalmic insert device 900. In this embodiment based around a fluid-based liquid meniscus embodiment, a Front Curve Piece 310 of a Multi-Piece Insert and a Back Curve Piece 940 are locked together using a self-locking mechanism to seal and encapsulate said Multi-Piece Insert device 900. A self-locking mechanism 960 utilizes a profile lip 970 extending from the knife-edge feature 945 on the Back Curve Piece 940 and a slot groove 960 on the Front Curve Piece 310. When the Front Curve Piece 310 and the Back Curve Piece 960 are pushed together, the profile lip 970 and the slot groove 960 create a positively locked junction. In the example embodiment, the groove 950 may also create a compression location to further secure the knife-edge feature 945 into the sealing feature 920. It may be clear that any of the related sealing embodiments other than a knife-edge may constitute art within the inventive scope herein.

Another optional feature of this embodiment may include a recess 930 along the entire periphery of the self-locking sealing mechanism 920, 945, 970, 960, and 950. Said recess 930 can accept an adhesive or sealant, such as, for example, the material listed in Table 1. This embodiment 900 depicts a single sealing location, but other embodiments may require multiple sealing locations. For example, in the device 400 in FIG. 4A, a self-locking sealing mechanism 920, 945, 970, 960, and 950 may provide additional diversity of uses for the concepts embodied by the claims. A first sealing surface may be useful for sealing the fluid containing regions of the center of the Lens, while a second annular ringed piece may be subsequently placed with an inner annular seal and an outer annular seal to enclose the interconnect, energization and electronic Components. The Back Curve Piece may be formed in such a manner to extend as one piece over all the regions. With multiple sealing surfaces for the different regions, the various sealing embodiments may be combined or used in multiple locations.

Methods and Materials for Insert-Based Ophthalmic Lenses

Referring back to FIG. 1, a diagram of an exemplary Mold device 100 for an ophthalmic Lens is illustrated with a Multi-Piece Insert 104. As used herein, a Mold device 100 includes a plastic formed to shape a cavity 106 into which a Lens-Forming Mixture can be dispensed such that upon reaction or cure of the Lens-Forming Mixture, an ophthalmic Lens of a desired shape is produced. The Molds and Mold assemblies 100 of this invention are comprised of more than one Mold parts or Mold pieces 101 and 102. The Mold parts 101 and 102 can be brought together in a manner that forms a cavity 106 between the Mold parts 101 and 102 in which a Lens can be formed. This combination of Mold parts 101 and 102 is preferably temporary. Upon formation of the Lens, the Mold parts 101 and 102 can again be separated for removal of the Lens.

At least one Mold part 101 and 102 has at least a portion of its surface in contact with the Lens-Forming Mixture so that upon reaction or cure of the Lens-Forming Mixture the surface provides a desired shape and form to the portion of the Lens with which it is in contact. The same is true of at least one other Mold part 101 and 102.

Thus, for example, in an exemplary embodiment a Mold device 100 is formed from two parts 101 and 102, a female concave piece (front curve Mold) 102 and a male convex piece (back curve Mold) 101 with a cavity 106 formed between them. The portion of the concave surface that makes contact with a Lens-Forming Mixture has the curvature of the front curve of an ophthalmic Lens to be produced in the Mold device 100. Said portion is sufficiently smooth and formed such that the surface of an ophthalmic Lens, formed by polymerization of the Lens-Forming Mixture that is in contact with the concave surface, is optically acceptable.

In some embodiments, the front curve Mold 102 can also have an annular flange integral to and surrounding a circular circumferential edge that extends from the front curve Mold 120 in a plane normal to the axis and also extends from the flange (not shown).

A Lens-Forming Surface can include a surface with an optical-quality surface finish, which indicates that it is sufficiently smooth and formed so that a Lens surface fashioned by the polymerization of a Lens-Forming Mixture in contact with the molding surface is optically acceptable. Further, in some embodiments, the Lens-Forming Surfaces of Mold pieces 101 and 102 can have a geometry that is necessary to impart to the Lens surface the desired optical characteristics, including, but not limited to, spherical, aspherical, and cylinder power; wave front aberration correction; corneal topography correction; and combinations thereof. One ordinarily skilled in the art will recognize that characteristics other than those discussed may also be included within the scope of the invention.

An Energy Source and a Component are mounted on a Multi-Piece Insert 104, which may be comprised of any receiving material onto which an Energy Source may be placed. In some embodiments, the Multi-Piece Insert 104 may also include, for example, circuit paths, Components, and other aspects useful to placing the Energy Source in electrical communication with the Component and enabling the Component to draw an electrical current from the Energy Source. The novel sealing and encapsulating innovations discussed herein, such as, for example, a sealed surface 105, allow for a functional insert to be manufactured in multiple pieces and then reliably assembled and sealed for eventual inclusion into an ophthalmic device, wherein materials in the ambient of the ophthalmic device and materials inside the insert device cannot diffuse through the insert materials or said seals 105.

Various embodiments also include placing an Energy Source into a Multi-Piece Insert 104 prior to placing the Multi-Piece Insert 104 into a Mold portion used to form a Lens. The Multi-Piece Insert 104 may also include one or more Components that will receive an electrical charge via the Energy Source.

In some embodiments, a Lens with a Multi-Piece Insert 104 can include a rigid center, soft skirt design wherein a central rigid optical element is in direct contact with the atmosphere and the corneal surface on respective anterior and posterior surfaces. The soft skirt of Lens material (typically a hydrogel material) is attached to a periphery of the rigid optical element, which also acts as a Multi-Piece Insert providing energy and functionality to the resulting ophthalmic Lens. In these embodiments, the function of encapsulants and seals 105 are important.

Some additional embodiments include a Multi-Piece Insert 104 that is a rigid Lens insert and fully encapsulated within a hydrogel matrix. A Multi-Piece Insert 104 that is a rigid Lens insert may be manufactured, for example, using microinjection-molding technology. Embodiments can include, for example, a poly(4-methylpent-1-ene) copolymer resin with a diameter of between about 6 mm to 10 mm and a front surface radius of between about 6 mm and 10 mm and a rear surface radius of between about 6 mm and 10 mm and a center thickness of between about 0.050 mm and 0.5 mm. Some exemplary embodiments include an insert with diameter of about 8.9 mm, a front surface radius of about 7.9 mm, a rear surface radius of about 7.8 mm, a center thickness of about 0.100 mm, and an edge profile of about 0.050 radius. One exemplary micromolding machine can include the Microsystem 50 five-ton system offered by Battenfield Inc. Some or all of the sealing features, including, but not limited to, grooves, slots, lips, and knife edges may be formed during the molding process or formed later by subsequent processing of the result of the molding process.

The Multi-Piece Insert can be placed in a Mold part 101 and 102 utilized to form an ophthalmic Lens. Mold part 101 and 102 material can include, for example, a polyolefin of one or more of the following: polypropylene, polystyrene, polyethylene, polymethyl methacrylate, and modified polyolefins. Other Molds can include a ceramic or metallic material.

Other Mold materials that may be combined with one or more additives to form an ophthalmic Lens Mold include, for example, Zieglar-Natta polypropylene resins (sometimes referred to as znPP); a clarified random copolymer for clean molding as per FDA regulation 21 CFR (c) 3.2; a random copolymer (znPP) with ethylene group.

Still further, in some embodiments, the Molds of the invention may contain polymers such as polypropylene, polyethylene, polystyrene, polymethyl methacrylate, modified polyolefins containing an alicyclic moiety in the main chain and cyclic polyolefins. This blend can be used on either or both Mold halves. Preferably, this blend is used on the Back Curve Piece, and the Front Curve Piece consists of the alicyclic co-polymers.

In some preferred methods of making Molds 100 according to the present invention, injection molding is utilized according to known techniques. Embodiments can also include Molds fashioned by other techniques including, for example, lathing, diamond turning, or laser cutting.

Typically, Lenses are formed on at least one surface of both Mold parts 101 and 102. However, in some embodiments, one surface of a Lens may be formed from a Mold part 101 and 102, and another surface of a Lens can be formed, for example, using a lathing method.

In some embodiments, a Multi-Piece Insert 400 may have a front curve surface 410 with an Optical Zone that includes a variable optic powered by an Energy Source 420, 430, 440, 470, and 480 located on the Multi-Piece Insert 400. The Multi-Piece Insert 400 can also include a Component 491, such as, for example, integrated circuitry, to control the variable optic included in the Optical Zone. In this discussion, a variable optic can be considered a Component.

An Energy Source can be in electrical communication with a Component 491. The Component 491 can include any device that responds to an electrical charge with a change in state, such as, for example, a semiconductor-type chip, a passive electrical device, or an optical device such as a crystal Lens.

In some specific embodiments, an Energy Source 420, 430, 440, 470, and 480 includes, for example, battery or other electrochemical cell, capacitor, ultracapacitor, supercapacitor, or other storage Component. Some specific embodiments can include a battery located on a Multi-Piece Insert 400 on the periphery of an ophthalmic Lens outside of the Optical Zone.

In some embodiments, a Lens type can include a Lens that includes a silicone-containing Component. A silicone-containing Component is one that contains at least one [—Si—O—] unit in a monomer, macromer, or prepolymer. Preferably, the total silicone and attached oxygen are present in the silicone-containing Component in an amount greater than about 20 weight percent, and more preferably greater than 30 weight percent of the total molecular weight of the silicone-containing Component. Useful silicone-containing Components preferably comprise polymerizable functional groups such as acrylate, methacrylate, acrylamide, methacrylamide, vinyl, N-vinyl lactam, N-vinylamide, and styryl functional groups.

In some embodiments, the ophthalmic Lens skirt, also called an insert-encapsulating layer, that surrounds the insert may be comprised of standard hydrogel Lens formulations. Exemplary materials with characteristics that may provide an acceptable match to numerous insert materials may include, but are not limited to, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated inserts and should be considered consistent and included within the scope of the claims.

Suitable silicone-containing Components include compounds of Formula I

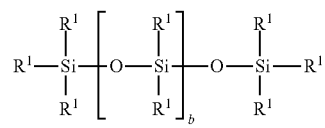

wherein $R^1$ is independently selected from monovalent reactive groups, monovalent alkyl groups, or monovalent aryl groups, any of which may further comprise functionality selected from hydroxy, amino, oxa, carboxy, alkyl carboxy, alkoxy, amido, carbamate, carbonate, halogen or combinations thereof; monovalent siloxane chains comprising 1-100 Si—O repeat units that may further comprise functionality selected from alkyl, hydroxy, amino, oxa, carboxy, alkyl carboxy, alkoxy, amido, carbamate, halogen, or combinations thereof;

where b is 0 to 500, where it is understood that when b is other than 0, b is a distribution having a mode equal to a stated value;

wherein at least one $R^1$ comprises a monovalent reactive group and, in some embodiments, between one and three $R^1$ comprise monovalent reactive groups.

As used herein, monovalent reactive groups are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl (meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates, and O-vinylcarbonates. Non-limiting examples of cationic reactive groups include vinyl ethers or epoxide groups and mixtures thereof. In one embodiment the free radical reactive groups comprise (meth)acrylate, acryloxy, (meth)acrylamide, and mixtures thereof.

Suitable monovalent alkyl and aryl groups include unsubstituted monovalent $C_{1-16}$alkyl groups, $C_{6-14}$ aryl groups, such as substituted and unsubstituted methyl, ethyl, propyl, butyl, 2-hydroxypropyl, propoxypropyl, polyethyleneoxypropyl, combinations thereof, and the like.

In one embodiment, b is 0, one $R^1$ is a monovalent reactive group, and at least three $R^1$ are selected from monovalent alkyl groups having 1 to 16 carbon atoms or, in another embodiment, from monovalent alkyl groups having 1 to 6 carbon atoms. Non-limiting examples of silicone Components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane, and 3-methacryloxypropylpentamethyl disiloxane.

In another embodiment, b is 2 to 20, 3 to 15 or, in some embodiments, 3 to 10; at least one terminal $R^1$ comprises a monovalent reactive group and the remaining $R^1$ are selected from monovalent alkyl groups having 1 to 16 carbon atoms or, in another embodiment, from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms, and the remaining $R^1$ comprise monovalent alkyl group having 1 to 3 carbon atoms. Non-limiting examples of silicone Components of this embodiment include (mono-(2-hydroxy-3-methacryloxypropyl)-propyl ether terminated polydimethylsiloxane (400-1000 MW)) ("OH-mPDMS"), and monomethacryloxypropyl terminated mono-n-butyl terminated polydimethylsiloxanes (800-1000 MW) (mPDMS).

In another embodiment, b is 5 to 400 or from 10 to 300, both terminal $R^1$ comprise monovalent reactive groups, and the remaining $R^1$ are independently selected from monovalent alkyl groups having 1 to 18 carbon atoms, which may have ether linkages between carbon atoms and may further comprise halogen.

In one embodiment, where a silicone hydrogel Lens is desired, the Lens of the present invention will be made from a Reactive Mixture comprising at least approximately 20 and preferably between approximately 20 and 70 percent weight silicone-containing Components based on total weight of reactive monomer Components from which the polymer is made.

In another embodiment, one to four $R^1$ comprises a vinyl carbonate or carbamate of Formula II

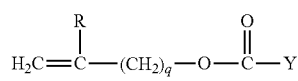

wherein Y denotes O—, S— or NH—; and R denotes hydrogen or methyl; d is 1, 2, 3, or 4; and q is 0 or 1.

The silicone-containing vinyl carbonate or vinyl carbamate monomers specifically include 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris (trimethylsiloxy)silyl]propyl allyl carbamate; 3-[tris (trimethylsiloxy)silyl]propyl vinyl carbamate; trimethylsilylethyl vinyl carbonate; trimethylsilylmethyl vinyl carbonate, and

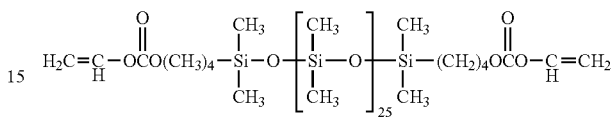

Where biomedical devices with modulus below approximately 200 are desired, only one $R^1$ shall comprise a monovalent reactive group and no more than two of the remaining $R^1$ groups will comprise monovalent siloxane groups.

Another class of silicone-containing Components includes polyurethane macromers of the following formulae:

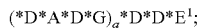

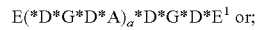

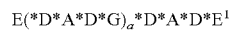   Formulae IV-VI wherein D denotes an alkyl diradical, an alkyl cycloalkyl diradical, a cycloalkyl diradical, an aryl diradical, or an alkylaryl diradical having 6 to 30 carbon atoms;
wherein G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
* denotes a urethane or ureido linkage;
$a$ is at least 1; and
A denotes a divalent polymeric radical of formula:

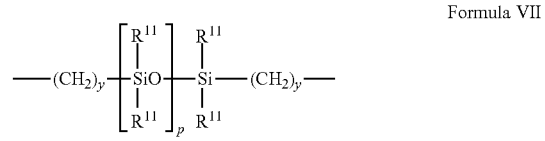   Formula VII wherein $R^{11}$ independently denotes an alkyl or fluoro-substituted alkyl group having 1

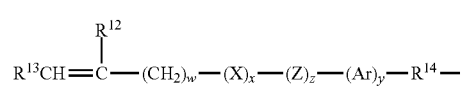

to 10 carbon atoms, which may contain ether linkages between carbon atoms; y is at least 1; and p provides a moiety weight of 400 to 10,000; each of E and $E^1$ independently denotes a polymerizable unsaturated organic radical represented by Formula VIII
wherein $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing Component is a polyurethane macromer represented by Formula IX (the full structure may be understood by joining corresponding asterisk regions, * to *,  to )

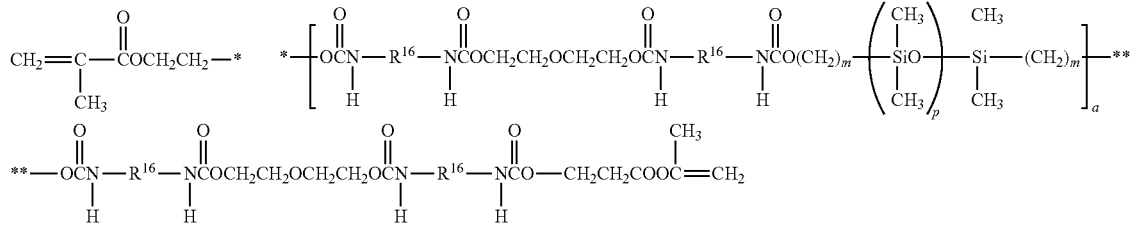

wherein $R^{16}$ is a diradical of a diisocyanate after removal of the isocyanate group, such as the diradical of isophorone diisocyanate. Another suitable silicone-containing macromer is a compound of formula X (in which x+y is a number in the range of 10 to 30) formed by the reaction of fluoroether, hydroxy-terminated polydimethylsiloxane, isophorone diisocyanate and isocyanatoethylmethacrylate. Formula X (the full structure may be understood by joining corresponding asterisk regions, * to *)

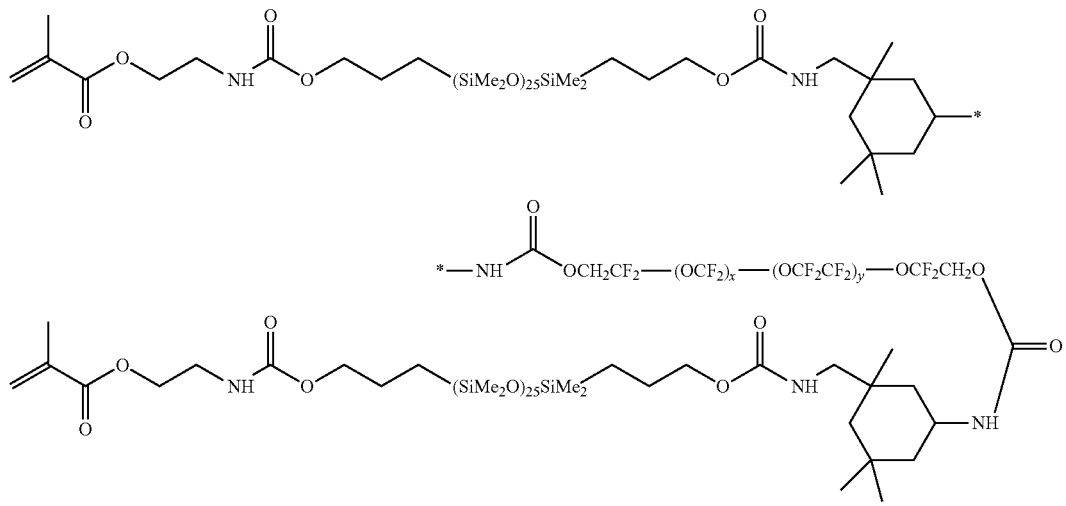

Other silicone-containing Components suitable for use in this invention include macromers containing polysiloxane, polyalkylene ether, diisocyanate, polyfluorinated hydrocarbon, polyfluorinated ether, and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone-containing Component in this invention.

Processes

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various embodiments of the present invention. It may be obvious to one skilled in the art that additional embodiments may be practical, and such methods are well within the scope of the claims.

Figure 10:
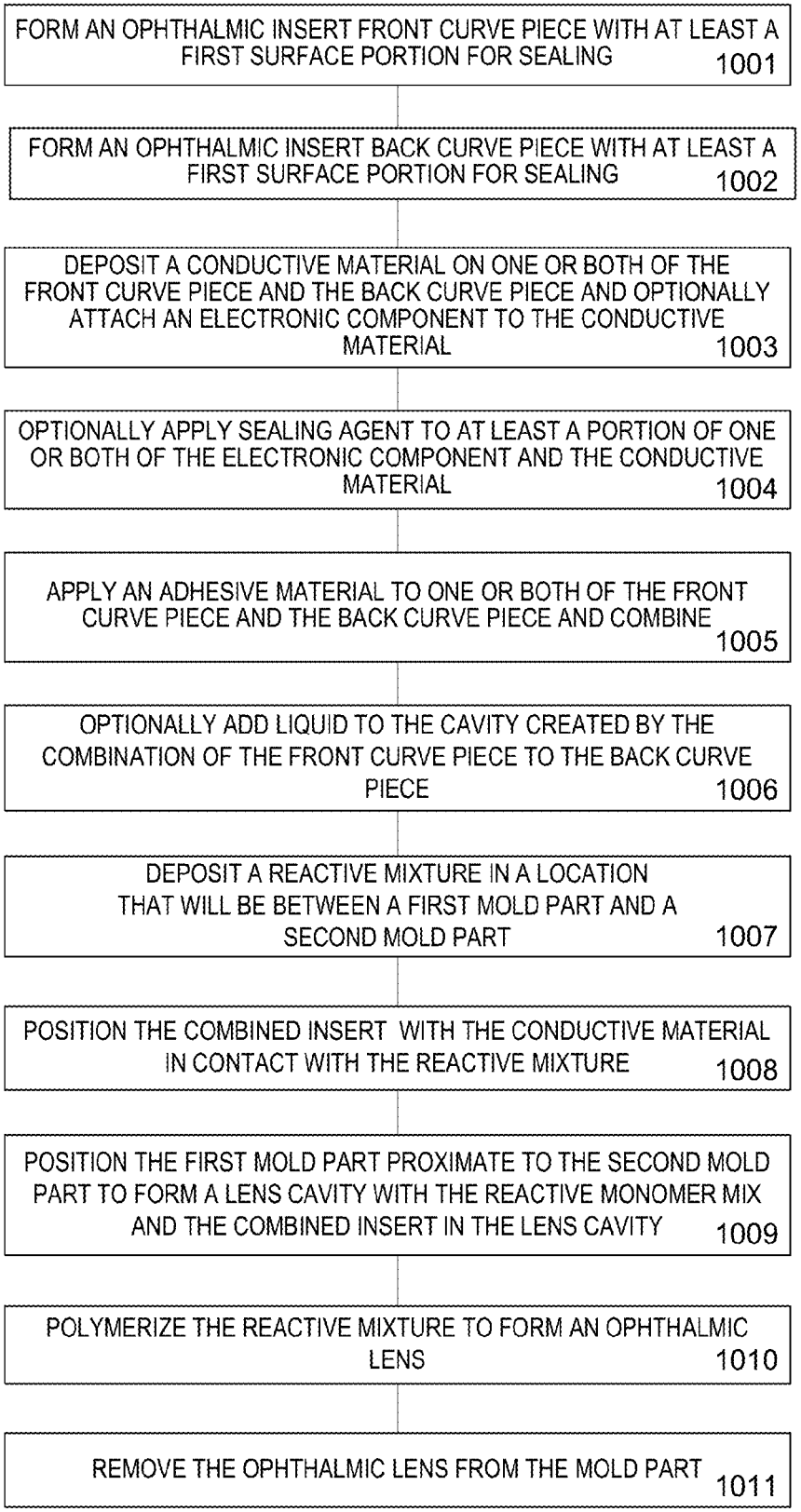
FIG. 10 illustrates method steps for forming an Energized ophthalmic Lens with a sealed and encapsulated Multi-Piece Insert according to some embodiments of the present invention.

Referring now to FIG. 10, a flowchart illustrates exemplary steps that may be used to implement the present invention. At 1001, a Front Curve Piece, such as, for example, that piece 310 shown in FIG. 3, is formed, and at 1002 a Back Curve Piece, such as, for example, the piece 340 shown in FIG. 3, is formed. These formation steps at 1001 and 1002 may be performed in either order or simultaneously.

At 1003, a conductive material may be applied to either or both the Front Curve Piece of the insert or the Back Curve Piece of the insert. At 1004, a sealing agent may be applied to at least a portion of either or both the electrical Component and the conductive material. This application at 1004 of sealing agent to the conductive material may occur throughout the sealing process, whereas the application at 1004 to the electrical Component may occur once the Component has been attached to the conductive material at 1003.

At 1005, an adhesive or sealing material may be applied to either or both of the Front Curve Piece and the Back Curve Piece. In some embodiments, the application of this material may involve the placement of a preformed piece upon one or both of the insert pieces. In some additional embodiments, there may be more than one Front Curve Piece or one Back Curve Piece or more than one of both pieces. In these embodiments, the step at 1005 would be repeated until all applicable pieces of the ophthalmic insert are combined into an insert.

The combination at 1005 of Front Curve Pieces to Back Curve Pieces inherently creates a cavity that may house, for example, as shown in FIG. 2, an active optical device 220. At 1006, said cavity may be at least partially filled with fluid. In some embodiments, the fluids may serve multiple functions, and multiple fluids may be added by repeating the step at 1006. For example, as illustrated in FIG. 3, two immiscible fluids 350 and 360 may create a meniscus-type Lens.

At 1007, a reactive monomer mix can be deposited between a first Mold part and a second Mold part or onto a surface of either the first or the second Mold part that will be between the two parts as a result of subsequent processing steps. At 1008, the combined insert is placed into a cavity formed by the first Mold part and the second Mold part or onto a surface that will be in a cavity formed by the first Mold part and the second Mold part at a later time. In some preferred embodiments, the combined insert 104 of FIG. 1 is placed in the Mold part 101 and 102 of FIG. 1 via mechanical placement. Mechanical placement can include, for example, a robot or other automation, such as, for example, those known in the industry to place surface mount Components. Human placement of an insert 104 is also within the scope of the present invention. Accordingly, any mechanical placement is effective so long as it places an insert 104 within a cast Mold part such that the polymerization of a Reactive Mixture contained by the Mold part will include the insert in a resultant ophthalmic Lens. In some embodiments, a processor device, MEMS, NEMS, or other Component may also be mounted in or on the insert and be in electrical communication with an Energy Source.

At 1009, the first Mold part can be placed proximate to the second Mold part to form a Lens-forming cavity with at least some of the reactive monomer mix and the Energy Source in the cavity. At 1010, the Reactive Monomer Mix within the cavity can be polymerized. Polymerization can be accomplished, for example, via exposure to one or both of actinic radiation and heat. At 1011, the Lens is removed from the Mold parts.

Although the invention may be used to provide hard or soft contact Lenses made of any known Lens material, or material suitable for manufacturing such Lenses, preferably, the Lenses of the invention are soft contact Lenses having water contents of approximately 0 to 90 percent. More preferably, the Lenses are made of monomers containing either or both hydroxy groups and carboxyl groups, or be made from silicone-containing polymers, such as siloxanes, hydrogels, silicone hydrogels, and combinations thereof. Material useful for forming the Lenses of the invention may be made by reacting blends of macromers, monomers, and combinations thereof along with additives such as polymerization initiators. Suitable materials include, without limitation, silicone hydrogels made from silicone macromers and hydrophilic monomers.

Apparatus

Figure 11:
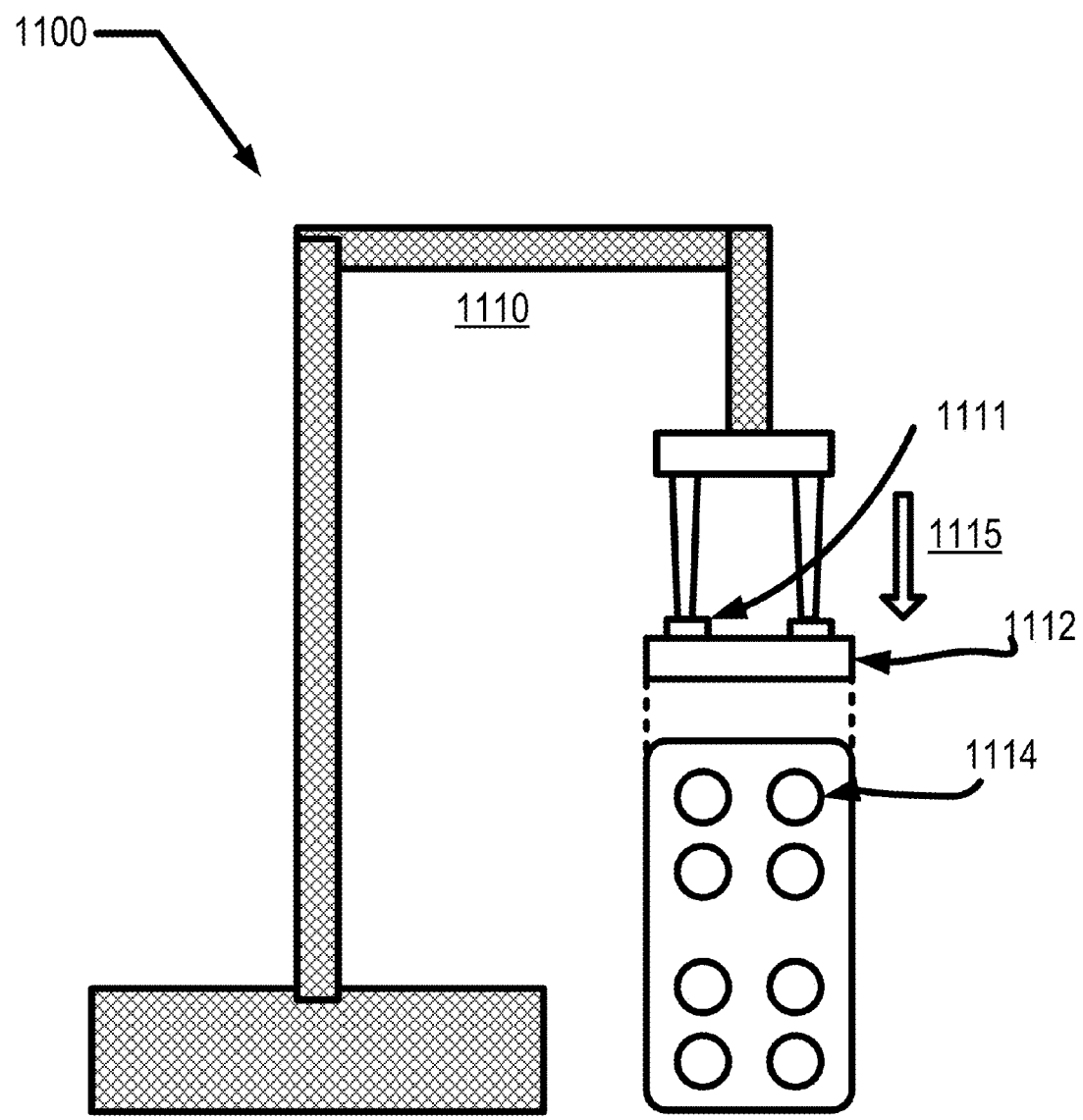
FIG. 11 illustrates an example of apparatus components for placing a sealed insert into an ophthalmic Lens Mold part.

Referring now to FIG. 11, an embodiment 1100 of an automated apparatus 1110 is illustrated with one or more insert 1114 transfer interfaces 1111. As illustrated, multiple Mold parts, each with an associated insert 1114, are contained on a pallet 1112 and presented to a media transfer interface 1111. Embodiments can include a single interface individually placing Multi-Piece Inserts 1114 or multiple interfaces (not shown) simultaneously placing Multi-Piece Inserts 1114 in multiple Mold parts, and in some embodiments, in each Mold.

Another aspect of some embodiments includes apparatus to support the Multi-Piece Insert 1114 while the body of the ophthalmic Lens is molded around these Components. The holding points may be affixed with polymerized material of the same type that will be formed into the Lens body.

Figure 12:
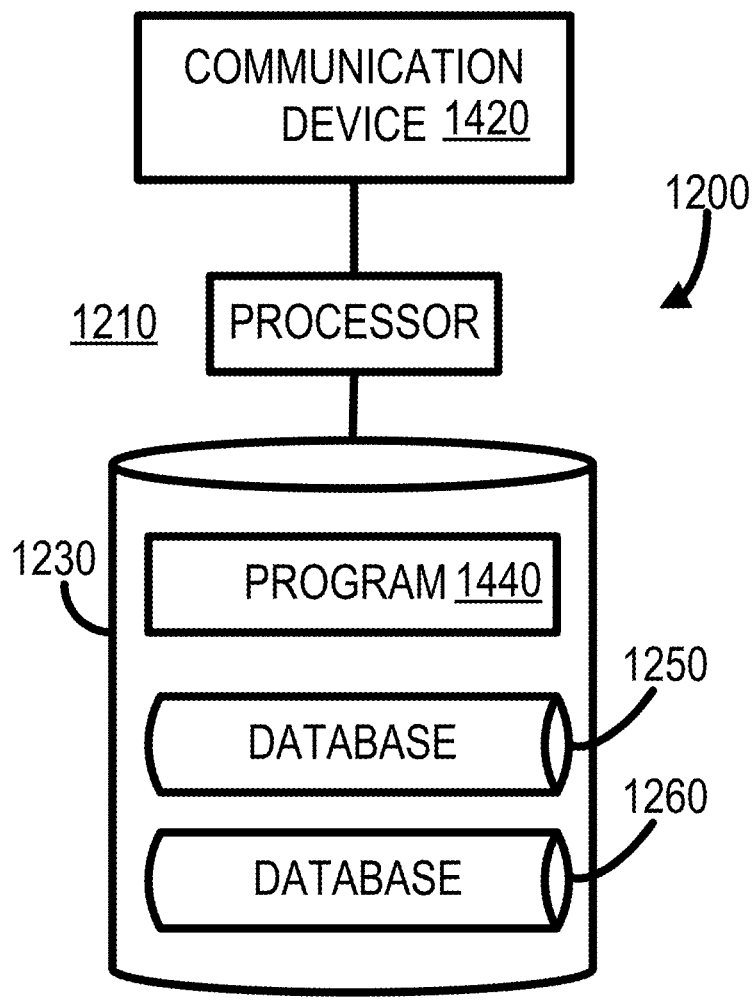
FIG. 12 illustrates a processor that may be used to implement some embodiments of the present invention.

Referring now to FIG. 12, a controller 1200 is illustrated that may be used in some embodiments of the present invention. The controller 1200 includes one or more processors 1210, which may include one or more processor Components coupled with a communication device 1220. In some embodiments, a controller 1200 can be used to transmit energy to an Energy Source placed in the ophthalmic Lens. In some embodiments, all the aforementioned Components may be located within a Multi-Piece Insert where the multiple pieces are sealed to define interior and exterior regions of the insert.

The processors 1210 are coupled with a communication device 1220 configured to communicate energy via a communication channel. The communication device 1220 may be used to electronically control one or more of the automation used in the placement of an insert into the ophthalmic Lens Mold part, the transfer of digital data to and from a Component mounted on or in an the insert media and placed within an ophthalmic Lens Mold part, or the Component incorporated into the ophthalmic Lens. The communication device 1220 may also be used to communicate, for example, with one or more controller apparatus or manufacturing equipment Components.

The processor 1210 is also in communication with a storage device 1230. The storage device 1230 may comprise any appropriate information storage device, including, but not limited to, combinations of magnetic storage devices such as magnetic tape and hard disk drives, optical storage devices, and/or semiconductor memory devices such as Random Access Memory (RAM) devices and Read Only Memory (ROM) devices.

The storage device 1230 can store a program 1240 for controlling the processor 1210. The processor 1210 performs instructions of a software program 1240 and thereby operates in accordance with the present invention. For example, the processor 1210 may receive information descriptive of an insert placement or Component placement. The storage device 1230 can also store ophthalmic-related data in one or more databases 1250 and 1260. The database may include customized insert designs, metrology data, and specific control sequences for controlling energy to and from an insert.

Seal and Encapsulating Features—Annular Pieces

Figure 13A:
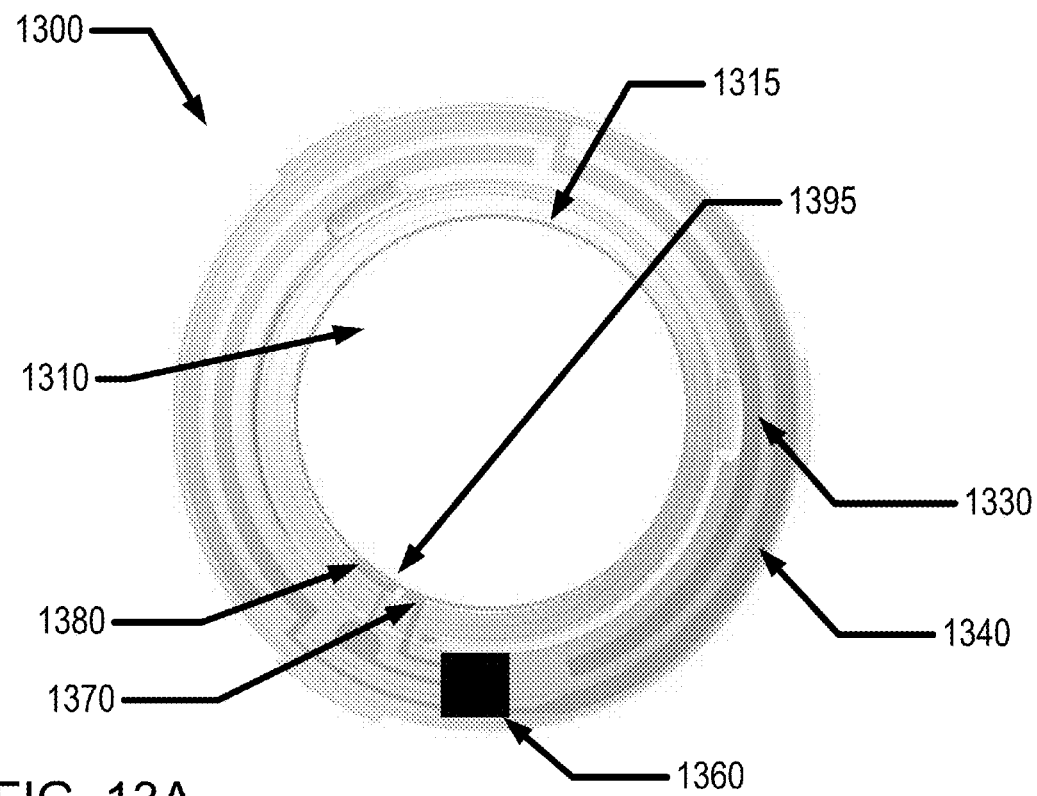
FIG. 13A illustrates a top down representation of an exemplary two-piece annular insert embodiment of a Multi-Piece Insert.

In some embodiments, the various aspects that have been discussed may be useful in different shaped devices. Proceeding to FIG. 13A, an annular-type insert device 1300 is illustrated. In contrast to previous embodiments wherein a central optic region may include active ophthalmic devices, in embodiments with all annular pieces, the central optic region 1310 may be devoid of material.

In annular types of embodiments, the resulting insert device 1300 may still be placed into an ophthalmic Lens. Similar to previous discussions, the annular device 1300 may be centered into a molding apparatus that may insert various materials, including, for example, hydrogel materials, to define the characteristics of the ophthalmic device.

An annular insert device 1300 may have different features and uses due to its shape. For example, a sealing edge 1315 may be present, which would not be present in embodiments where the Optical Zone is included in either or both of the Front Curve Piece and Back Curve Pieces, as shown, for example, in FIG. 3 with pieces 310 and 340, respectively. As shown as an example in the cross-sectional view, FIG. 13B, a sealing feature 1393 may utilize or reinforce the sealing edge 1315. Additionally, the presence of this new sealing edge 1315 may allow for other functions such as, for the example, the ability to make portions of the sealing edge 1315 porous to fluids in the environment. In other embodiments, such porous characteristics may also be introduced into the surface portions of the insert device 1300. The use of a sealing feature 1393 where electrical traces traverse the seal edge 1315 may create sealable cavities and may allow interaction with devices like energization elements and electrical Components that may reside in said sealable cavities.

Nevertheless, the inner periphery seal-edge feature 1393 of an annular insert device 1300 creates a unique environment for such function since it may have electrical conductive traces 1380 that pass through the seal edge 1315 and onto other devices. Returning to FIG. 13A, the annular insert device 1300 may have a void in the central optic region 1310. The central optic region 1310 may include a seal edge 1315 that may be sealed by the various embodiments disclosed herein. Electrically conductive traces 1330 and 1340 may be deposited on the annular insert device 1300. In some embodiments, these traces 1330 and 1340 may have energization elements deposited or attached to them, such as, for example, an integrated circuit 1360 that has been connected to the electrically conductive traces 1330 and 1340. There may be further connections to additional electrically conductive traces 1370 and 1380. These traces 1330, 1340, 1370, and 1380 may connect to a sensing feature 1395 that may be able to monitor the wearer, including, but not limited to gauging changes in conductivity of the tear fluid in the space surrounding the sensing feature 1395. One ordinarily skilled in the art will recognize that numerous types of sensing devices may be practical, and such embodiments are well within the scope of the claims.

In other embodiments, the traces 1370 and 1380 may be useful to control the dispensing of fluids or medicament from the sensing feature 1395. The location and presence of the sensing feature 1395 relative to the embodiment 1300 are demonstrated for exemplary purposes only, and such function may be included at any portion of the surface features of the annular insert device 1300. One ordinarily skilled in the art will recognize that aspects of the sealing methodology discussed herein may be utilized in such locations.

Figure 13B:
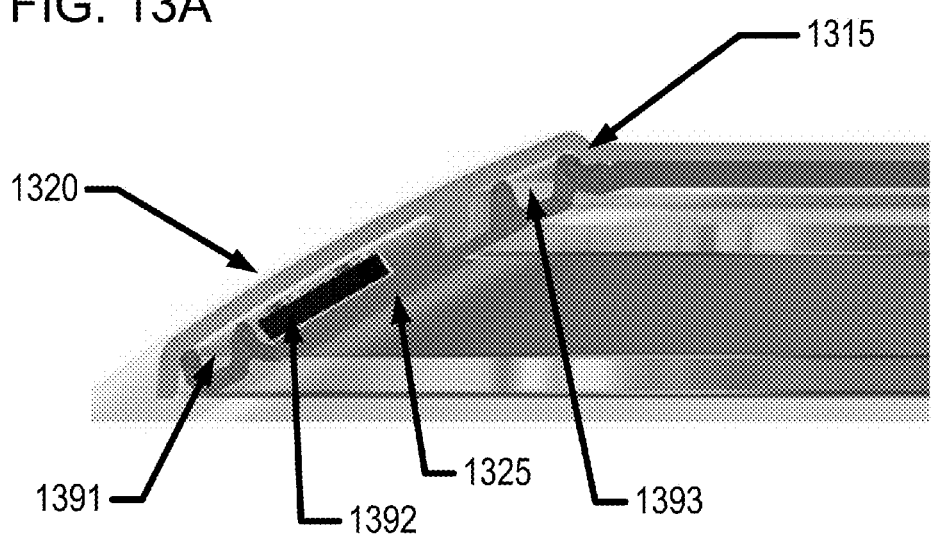
FIG. 13B illustrates a cross-sectional representation of an exemplary two-piece annular insert embodiment of a Multi-Piece Insert.

Continuing with the cross sectional representation FIG. 13B, a first sealing feature 1391 may allow for the sealing of the Front Curve Piece 1320 to the Back Curve Piece 1325. An annular feature inherently has an inner and outer periphery, allowing for a seal 1393 to be formed along the said inner periphery. Embodiments of annular insert devices may additionally include sealing features, including, for example, a knife-edge and pressure seal as shown in FIG. 10.

The annular insert device 1300 may contain energization elements, conductive traces 1330, 1340, 1360, and 1370 and integrated circuits 1392, or other electronic elements. In some embodiments, these Components 1392 may reside in a sealed cavity surrounding said Component. Components may be treated with encapsulating agents to surround and seal the Components to the Front Curve Piece 1320 or Back Curve Piece 1325, before any combination of the two pieces is made to form an annular insert device 1300.

Figure 14:
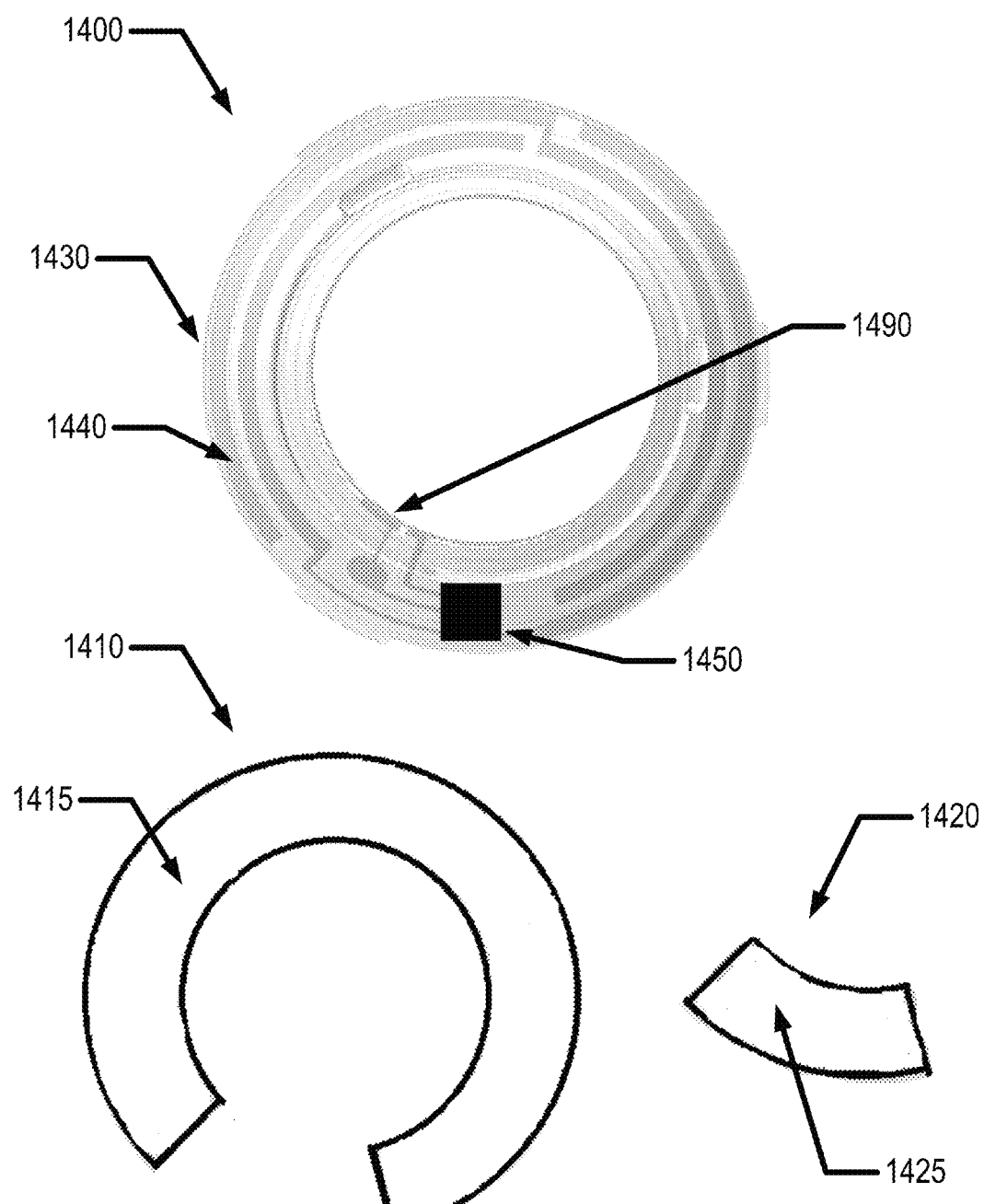
FIG. 14 illustrates an exemplary three-piece annular insert embodiment of a Multi-Piece Insert.

FIG. 14 illustrates how three pieces that when assembled may form an annular Multi-Piece Insert 1400. An annular Front Curve Piece 1430 may include, for example, electrically conductive traces 1440 and integrated circuits 1450. The Back Curve Pieces 1410 and 1420 may be individual portions of an annular insert device 1400. The Front Curve Piece 1430 and Back Curve Pieces 1410 and 1420 may be combined to form a full annular device 1400. In other embodiments, the two Back Curve Pieces 1410 and 1420 may be combined to complete less than the full shape of the Front Curve Piece 1430. In FIG. 14, the Front Curve Piece 1430 is illustrated as a single piece and the Back Curve Pieces 1410 and 1420 are illustrated as partial pieces, though the reverse may apply in other embodiments.

In assembling the pieces of the annular insert device 1400, it may be apparent that the pieces 1430, 1410, and 1420 may be assembled two pieces at a time or all three pieces together. The order of assembling the pieces may vary in some embodiments. As an example, the Front Curve Piece 1430 may have electrical traces 1440 attached to an integrated circuit 1450. Using a method as demonstrated in FIG. 10 at 1001 to 1004, the Back Curve Piece 1420 and the Front Curve Piece 1430 may be combined and sealed by one of the various discussed embodiments resulting in a first cavity 1425 that may be able to house the integrated circuit 1450 and the electrical traces 1440. In some embodiments, the periphery of the combined Front Curve Piece 1430 and the Back Curve Piece 1420 may contain a sensor 1490.

The newly formed insert pieces 1430, 1410, and 1420 may now have energization elements applied upon the conductive traces that reside outside the cavity region 1425 but upon the insert surface. The Back Curve Piece 1410 may be combined with the Front Curve Piece 1430 to seal a second cavity region 1415. The relative order of these steps is exemplary and a different order is well within the scope of the inventive art, as well as the extension of the concept to different numbers of insert pieces.

Methods for Annular Insert-Based Ophthalmic Lenses

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various embodiments of the present invention. It may be obvious to one skilled in the art that additional embodiments may be practical, and such methods are well within the scope of the claims.

Figure 15:
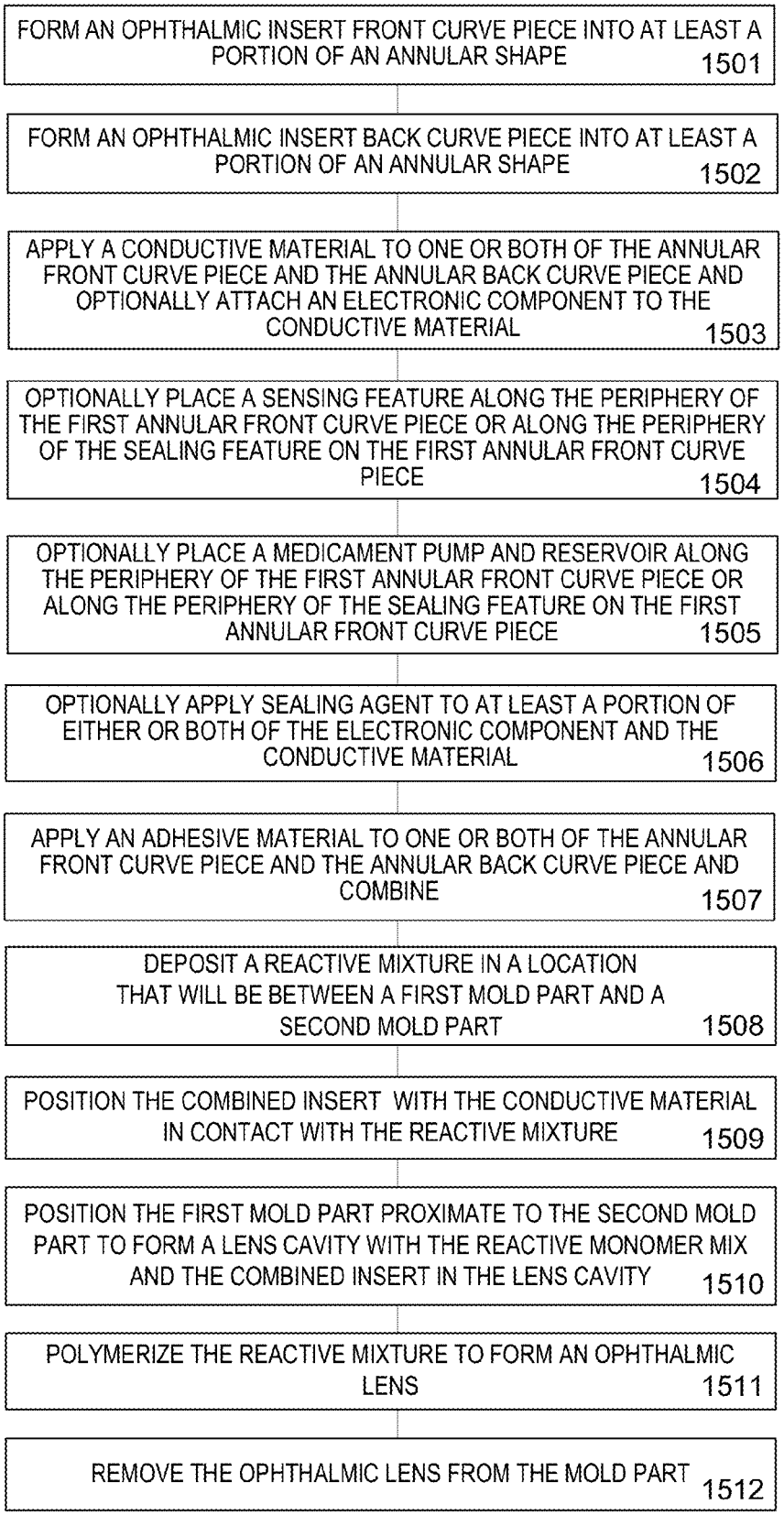
FIG. 15 illustrates exemplary method steps for forming an annular Multi-Piece Insert.

Referring now to FIG. 15, a flowchart illustrates exemplary steps that may be used to implement the present invention. At 1501, at least a portion of an annular Front Curve Piece, such as, for example, that piece 1320 shown in FIG. 13, is formed, and at 1502 at least a portion of an annular Back Curve Piece, such as, for example, the piece 1325 shown in FIG. 13, is formed. These formation steps at 1501 and 1502 may be performed in either order or simultaneously. In other alternative embodiments, the formation steps at 1501 and 1502 may result in partial annular pieces, such as, for example, the Back Curve Pieces 1410 and 1420 in FIG. 14. In some embodiments, the formation steps at 1501 and 1502 may result in pieces of varying portions of an annular shape wherein the Front Curve Pieces, such as, for example, said piece 1430 in FIG. 14, are not of equivalent annular portions to the Back Curve Pieces, such as, for example, said pieces 1410 and 1420 in FIG. 14.

At 1503, a conductive material may be applied to either or both the annular Front Curve Piece of the insert or the annular Back Curve Piece of the insert. At 1504, a sensing feature may be placed along the periphery of an annular Front Curve Piece or, alternatively, along the periphery of a sealing feature on a Front Curve Piece, such as, for example, the annular Front Curve Piece 1320 or the sealing feature 1391 in FIG. 13. In some specific embodiments, at 1505, a medicament pump and reservoir may be placed along the periphery of an annular Front Curve Piece or, alternatively, along the periphery of a sealing feature on a Front Curve Piece, such as, for example, the annular Front Curve Piece 1320 or the sealing feature 1391 in FIG. 13.

At 1507, an adhesive or sealing material may be applied to either or both of the annular Front Curve Piece and the annular Back Curve Piece. In some embodiments, the application of this material may involve the placement of a preformed piece upon one or both of the insert pieces. In some additional embodiments, there may be more than one of either or both an annular Front Curve Piece and an annular Back Curve Piece, and those pieces may combine to create less than a completed annular portion. In these embodiments, the step at 1507 would be repeated until all applicable pieces of the ophthalmic insert are combined into an insert.

At 1508, a reactive monomer mix can be deposited between a first Mold part and a second Mold part or onto a surface of either the first or the second Mold part that will be between the two parts as a result of subsequent processing steps. At 1509, the combined insert is placed into a cavity formed by the first Mold part and the second Mold part or onto a surface that will be in a cavity formed by the first Mold part and the second Mold part at a later time. In some preferred embodiments, the combined insert 104 of FIG. 1 is placed in the Mold part 101 and 102 of FIG. 1 via mechanical placement. Mechanical placement can include, for example, a robot or other automation, such as, for example, those known in the industry to place surface mount Components. Human placement of an insert 104 is also within the scope of the present invention. Accordingly, any mechanical placement is effective so long as it places an insert 104 within a cast Mold part such that the polymerization of a Reactive Mixture contained by the Mold part will include the insert in a resultant ophthalmic Lens. In some embodiments, a processor device, MEMS, NEMS, or other Component may also be mounted in or on the insert and be in electrical communication with an Energy Source.

At 1510, the first Mold part can be placed proximate to the second Mold part to form a Lens-forming cavity with at least some of the reactive monomer mix and the Energy Source in the cavity. At 1511, the Reactive Monomer Mix within the cavity can be polymerized. Polymerization can be accomplished, for example, via exposure to one or both of actinic radiation and heat. At 1512, the Lens is removed from the Mold parts.

Although the invention may be used to provide hard or soft contact Lenses made of any known Lens material, or material suitable for manufacturing such Lenses, preferably, the Lenses of the invention are soft contact Lenses having water contents of approximately 0 to 90 percent. More preferably, the Lenses are made of monomers containing either or both hydroxy groups and carboxyl groups, or be made from silicone-containing polymers, such as siloxanes, hydrogels, silicone hydrogels, and combinations thereof. Material useful for forming the Lenses of the invention may be made by reacting blends of macromers, monomers, and combinations thereof along with additives such as polymerization initiators. Suitable materials include, without limitation, silicone hydrogels made from silicone macromers and hydrophilic monomers.

CONCLUSION

The present invention, as described above and as further defined by the claims below, provides methods for sealing and encapsulating Components within and upon Multi-Piece Inserts and apparatus for implementing such methods, as well as ophthalmic Lenses formed with the Multi-Piece Inserts.

The invention claimed is:

1. A method of forming an annular multi-piece insert for an ophthalmic lens, the method comprising:
   forming a first insert back curve piece into at least a portion of a first annular shape having an inner peripheral edge and an outer peripheral edge;
   forming a first insert front curve piece into at least a portion of a second annular shape having an inner peripheral edge and an outer peripheral edge;
   depositing a conductive material onto one or both of the first insert front curve piece and first insert back curve pieces;
   attaching an electronic component to one or both of the first insert front curve piece and first insert back curve pieces, wherein the attachment is made at least in part to the conductive material;
   placing a first material, upon a surface of one or both of the first insert front curve piece and first insert back curve pieces; and
   combining the first insert back curve piece with the first insert front curve piece to form a first annular ophthalmic insert piece such that the inner peripheral edge of the front curve piece and the inner peripheral edge of the back curve piece overlap to form an inner edge seal and the outer peripheral edge of the front curve piece and the outer peripheral edge of the back curve piece overlap to form an outer edge seal, wherein the combining causes the first material to seal a first cavity interior to the combination of the first back curve piece and the first front curve piece.

2. The method of claim 1, additionally comprising the steps of:
   forming at least a second insert back curve piece, into a portion of said first annular shape;
   placing a second material to form a second seal upon either or both of the first insert front curve piece and second insert back curve pieces; and
   combining the first annular ophthalmic insert piece with the second insert back curve piece to form a second annular ophthalmic insert piece, wherein the combining causes the second material to seal a second cavity interior to the combination of the first ophthalmic insert piece and the second insert back curve piece.

3. The method of claim 1, wherein the first cavity contains the electronic component.

4. The method of claim 1, wherein the electronic component is exterior to the sealed first cavity.

5. The method of claim 1, additionally comprising: placing a first sensing element adjacent to the inner edge seal, wherein the first sensing element is in electrical communication with the electronic component.

6. The method of claim 5, additionally comprising: placing a medicament pump and reservoir along the adjacent to the inner edge seal.

7. The method of claim 1, additionally comprising: placing a second sensing element upon a surface of the first insert front curve piece remote from some inner edge seal, wherein the second sensing element is in electrical communication with the electronic component.

8. The method of claim 1, wherein the first sealing material comprises a first preformed shape, and wherein one or both of the first annular shape and second annular shape accommodates the first preformed shape.

9. The method of claim 1, wherein the first material creates the first seal through mechanical contact between the first material and a first portion of one or both of the first insert back curve piece and the first insert front curve piece.

10. The method of claim 9, further comprising:
placing a second material on one or both of the first insert front curve piece and the first insert back curve piece that forms a second material adhesive seal between the first insert front curve piece and first insert back curve piece
that maintains physical contact of one or both of the first insert back curve piece and the first insert front curve piece to the first material.

11. The method of claim 9, wherein the first material further comprises a first self-locking feature capable of maintaining a physical contact of one or both of the first insert back curve piece and the first insert front curve piece to the first material.

12. The method of claim 11, wherein the first self-locking feature fixedly holds the first insert back curve piece in a relative position to the first insert front curve piece.

13. The method of claim 2, wherein the first insert back curve piece includes a first self-locking feature; the second insert back curve piece includes a second self-locking feature, wherein the second self-locking feature is capable of interlocking with the first self-locking feature.

14. The method of claim 1, additionally comprising: applying a sealing agent to at least a portion of the electronic component after attachment of the electronic component is made to the conductive material.

15. The method of claim 1, additionally comprising: applying a sealing agent to at least a portion of the conductive material.

16. The method of claim 2, additionally comprising: applying a sealing agent to at least a portion of the conductive material.

17. The method of claim 1, additionally comprising:
depositing a reactive mixture on a surface of a first mold part;
positioning the first annular ophthalmic insert piece in contact with the reactive mixture;
positioning a second mold part proximate to the first mold part to form a lens cavity, wherein the reactive mixture and the first ophthalmic insert are located within the lens cavity;
polymerizing the reactive mixture to form an ophthalmic lens; and
removing the ophthalmic lens from the mold parts.

18. The method of claim 2, additionally comprising:
depositing a reactive mixture on a surface of a first mold part;
positioning the second annular ophthalmic insert piece in contact with the reactive mixture;
positioning the second mold part proximate to the first mold part to form the lens cavity, wherein the reactive mixture and the second ophthalmic insert are located within the cavity;
polymerizing the reactive mixture to form the ophthalmic lens; and
removing the ophthalmic lens from the mold parts.

19. The method of claim 1, additionally comprising: adding a colorant layer to the periphery of the insert.

20. The method of claim 2, wherein the second ophthalmic insert includes an energization component, in electrical communication with the electronic component.

21. The method of claim 1, wherein the first insert back curve piece includes a first sealing feature adjacent the inner peripheral edge and a second sealing feature adjacent the outer peripheral edge.

22. The method of claim 21, wherein said sealing features comprise raised annular projections formed in the first insert back curve piece.

23. The method of claim 22, wherein said first sealing feature and said inner peripheral edge of said first insert back curve piece form a first groove, said second sealing feature and said outer peripheral edge of said insert back curve piece form a second groove and said first material is disposed within said grooves.

24. The method of claim 23, wherein said first insert front curve piece includes raised annular projections adjacent its inner peripheral edge and outer peripheral edge which engage the first material within the grooves in the first insert back curve piece.

* * * * *